US011258861B2

(12) United States Patent
Dewan et al.

(10) Patent No.: US 11,258,861 B2
(45) Date of Patent: Feb. 22, 2022

(54) SECURE REPORTING OF PLATFORM STATE INFORMATION TO A REMOTE SERVER

(71) Applicant: Intel Corporation, Santa Clara, CA (US)

(72) Inventors: Prashant Dewan, Portland, OR (US); Siddhartha Chhabra, Portland, OR (US); Uttam K. Sengupta, Portland, OR (US); Howard C. Herbert, Queen Creek, AZ (US)

(73) Assignee: Intel Corporation, Santa Clara, CA (US)

( * ) Notice: Subject to any disclaimer, the term of this patent is extended or adjusted under 35 U.S.C. 154(b) by 557 days.

(21) Appl. No.: 16/023,233

(22) Filed: Jun. 29, 2018

(65) Prior Publication Data
US 2019/0045016 A1 Feb. 7, 2019

(51) Int. Cl.
*H04L 29/06* (2006.01)
*G06F 21/54* (2013.01)
(Continued)

(52) U.S. Cl.
CPC ........ *H04L 67/142* (2013.01); *H04L 63/0435* (2013.01); *H04L 63/105* (2013.01); *H04L 63/1466* (2013.01); *H04L 63/20* (2013.01)

(58) Field of Classification Search
CPC ..... H04L 67/142; H04L 63/105; H04L 63/20; H04L 63/1466; H04L 63/0435
See application file for complete search history.

(56) References Cited

U.S. PATENT DOCUMENTS

2012/0159184 A1* 6/2012 Johnson .................. G06F 21/53
713/189
2015/0381442 A1* 12/2015 Delgado ............... H04L 43/065
713/168
2016/0364341 A1* 12/2016 Banginwar ......... G06F 9/45558

FOREIGN PATENT DOCUMENTS

WO WO-2017136101 A1 * 8/2017 ......... G06F 12/1491

OTHER PUBLICATIONS

Yaxing Chen; Wenhai Sun; Ning Zhang; Qinghua Zheng; Wenjing Lou; Y. Thomas Hou; "Towards Efficient Fine-Grained Access Control and Trustworthy Data Processing for Remote Monitoring Services in IoT"; IEEE Transactions on Information Forensics and Security; Year: 2019 | Publisher: IEEE | pp. 1830-1842 (Year: 2019).*

(Continued)

*Primary Examiner* — Shewaye Gelagay
*Assistant Examiner* — Courtney D Fields
(74) *Attorney, Agent, or Firm* — Alliance IP, LLC

(57) ABSTRACT

Technologies disclosed herein provide a method for receiving at a device from a remote server, a request for state information from a first processor of the device, obtaining the state information from one or more registers of the first processor based on a request structure indicated by a first instruction of a software program executing on the device, and generating a response structure based, at least in part, on the obtained state information. The method further includes using a cryptographic algorithm and a shared key established between the device and the remote server to generate a signature based, at least in part, on the response structure, and communicating the response structure and the signature to the remote server. In more specific embodiments, both the response structure and the request structure each include a same nonce value.

20 Claims, 11 Drawing Sheets

(51) Int. Cl.
　　　G06F 21/30　　　(2013.01)
　　　H04L 67/142　　　(2022.01)

(56) References Cited

OTHER PUBLICATIONS

"Diffie-Hellman key exchange", accessed at: https://en.wikipedia.org/wiki/Diffie%E2%80%93Hellman_key_exchange on Jun. 28, 2018, last updated Jun. 22, 2018, 7 pages.
"HMAC", accessed at: https://en.wikipedia.org/wiki/HMAC on Jun. 28, 2018, last updated Jun. 25, 2018, 6 pages.
Costan, V., & Devadas, S. (2016). Intel SGX Explained. IACR Cryptol. ePrint Arch., 2016, 86, 118 pages, retrieved on Jan. 7, 2020 from https://www.semanticscholar.org/paper/Intel-SGX-Explained-Costan-Devadas/a42e086f2382d518a0213879050e344539c2bcfa.
Gillespie, Matt, "Intel Trusted Execution Technology: A Primer," Intel Development Topics & Technologies, published Jun. 2, 2009, last updated Jan. 1, 2015, 9 pages, retrieved from https://software.intel.com/content/www/us/en/develop/articles/intel-trusted-execution-technology-a-primer.html.

\* cited by examiner

SIGNED REQUEST STRUCTURE

| FIELD NAME | SIZE (IN BITS) | VALUE |
|---|---|---|
| NONCE | 64 | 0000...1101 |
| XD | 1 | 1 |
| VTx | 1 | 1 |
| VTd | 1 | 1 |
| SMM | 1 | 1 |
| UMIP | 1 | 0 |
| ... | | |
| REQUEST SIGNATURE | 512 | N/A |

FIG. 4A

SIGNED RESPONSE STRUCTURE

| FIELD NAME | SIZE (IN BITS) | VALUE |
|---|---|---|
| NONCE | 64 | 0000...1101 |
| XD | 1 | 1 |
| VTx | 1 | 0 |
| VTd | 1 | 0 |
| SMM | 1 | 1 |
| UMIP | 1 | 0 |
| ... | | |
| RESPONSE SIGNATURE | 512 | N/A |

FIG. 4B

STATE INFORMATION REPORT

| RESPONSE STRUCTURE | RESPONSE SIGNATURE (CRYPTOGRAPHIC VALUE OF RESPONSE_STRUCTURE + REQUEST_STRUCTURE) | REQUEST STRUCTURE |
|---|---|---|

FIG. 4C

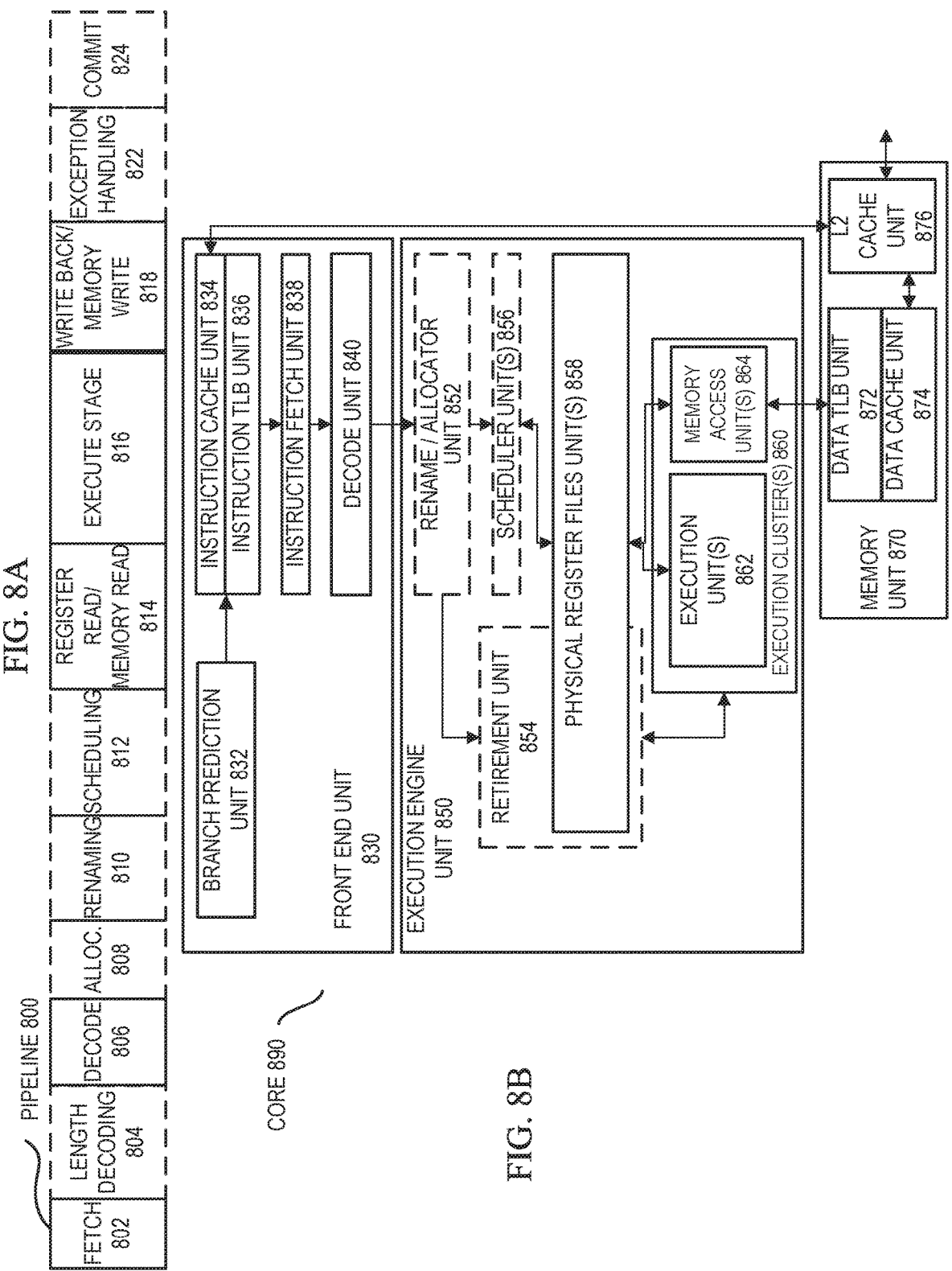

SECURE REPORTING OF PLATFORM STATE INFORMATION TO A REMOTE SERVER

TECHNICAL FIELD

This disclosure relates in general to the field of computer security and, more particularly, to secure reporting of platform state information to a remote server.

BACKGROUND

Zero-touch provisioning of devices is becoming increasingly common, particularly for enterprises and other entities that maintain a large number of devices with various computing platforms. With zero-touch provisioning, however, information technology (IT) services often need to securely obtain state information from the computing platforms of the devices being provisioned to unlock secrets or provide services. Such information can provide important insight into device security and authentication mechanisms and features, for example. IT services may be provided to or withheld from a device based on particular state information of the computing platform. In some scenarios, the state information of a computing platform at a given time may affect the level of IT services provided to the device. Accordingly, effective techniques are needed to securely obtain state information of a computing platform.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIGS. 4A-4C are tables illustrating example formats of data structures for implementing the secure reporting of platform state information according to at least one embodiment;

FIG. 8A is a block diagram illustrating both an exemplary in-order pipeline and an exemplary register renaming, out-of-order issue/execution pipeline according to at least one embodiment of the disclosure;

FIG. 8B is a block diagram illustrating both an exemplary embodiment of an in-order architecture core and an exemplary register renaming, out-of-order issue/execution architecture core to be included in a processor according to at least one embodiment of the disclosure;

DETAILED DESCRIPTION OF EMBODIMENTS

Figure 1:
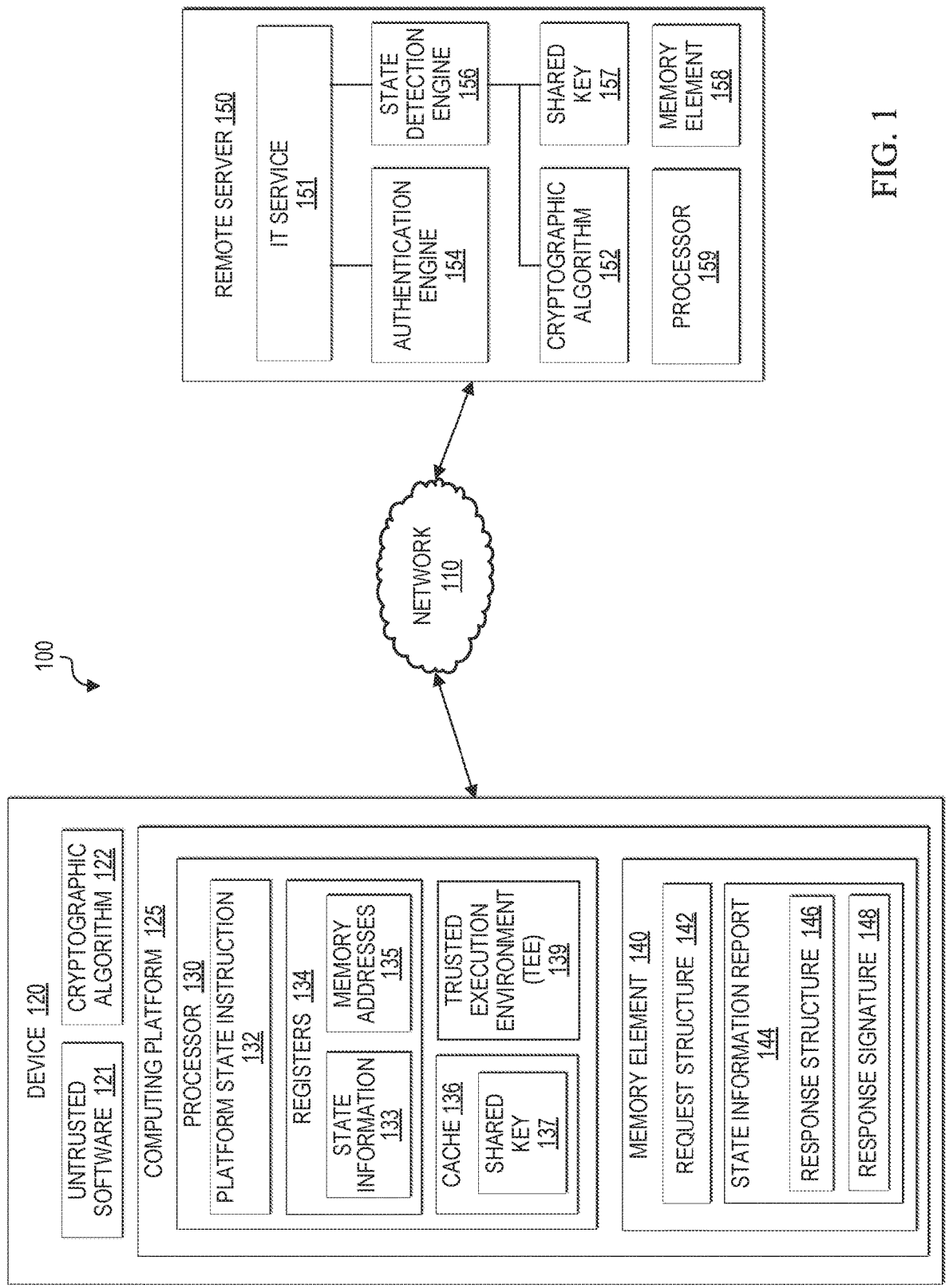
FIG. 1 is a simplified block diagram illustrating a communication system for securely reporting platform state information according to at least one embodiment of the present disclosure.

The following disclosure provides various possible embodiments, or examples, for implementing secure reporting of platform state information. State information of a computing platform can include configuration information and/or information related to the computing platform operating at a given time. Embodiments herein enable a remote server to request and receive selected state information of a computing platform. The selected state information can be retrieved from the computing platform by untrusted software having various privilege levels including, for example, user applications with ring 3 (low-level) privileges and system software with ring 0 (high-level) privileges. In at least one embodiment, retrieved state information can be secured by using a cryptographic algorithm and a shared key at the computing platform to generate a response signature based, at least in part, on the retrieved state information. The retrieved state information and response signature can be communicated to the remote server. The integrity of the received state information can be verified at the remote server by using a cryptographic algorithm and the shared key to generate a verification signature based on the received state information, and then comparing the response signature to the verification signature. Accordingly, untrusted software of any privilege level can securely report state information of the computing platform to a remote server, and the remote server can verify the integrity of the received state information and take appropriate action based on the integrity verification.

For purposes of illustrating the several embodiments that enable secure reporting of platform state information, it is important to first understand activities involved in obtaining state information from a computing platform. Accordingly, the following foundational information may be viewed as a basis from which the present disclosure may be properly explained.

In today's computing environment, a wide variety of information technology (IT) services are provided to individuals, enterprises, and other entities. Internet connectivity, enterprise application software, security software, network administration, and compliance monitoring are just a few examples of the myriad of available IT services. IT service providers (e.g., cloud service providers, Internet service providers, application service providers, etc.) as well as local IT infrastructure often require computing platforms to which they are providing services to be configured with particular features. The computing platforms may also be required, when running, to have particular features enabled and to execute particular processes that are compliant with the requirements of the IT service provider or local IT infrastructure.

As used herein, 'platform state information' (also referred to herein as 'state information') is intended to include configuration information and current operational information of a computing platform that includes at least one processor and at least one memory element. Configuration information can include any information that indicates features, abilities, capacities, capabilities, arrangements, structures, or make-up of the computing platform. Configuration information may include, but is not necessarily limited to, one or more of the hardware and software details of components and/or attached devices and the enabled/disabled status of certain features. Example features may include, but are not necessarily limited to security features, virtualization features, memory features, and user authentication features.

Current operational information (also referred to herein as 'operational information') can include any information related to the operation of the computing platform. Operational information may include, but is not necessarily limited to, one or more of whether the platform was booted using a secure boot, whether a particular security mechanism (e.g., biometric authentication) was used to login to the device, currently executing processes, and features enabled in the bios. Often, a security feature of a computing platform can be enabled by the bios setting a bit that corresponds to the security feature.

Generally, state information may be saved in a storage area such as a register of a central processing unit (CPU) (also referred to herein as 'processor' and/or 'processing element'). Registers are generally not directly accessible by software unless the software has a high privilege level. For example, in x86 instruction set architecture, which is based on certain CPUs made by Intel Corporation, four privilege levels referred to as ring 0, ring 1, ring 2, and ring 3 can be used to protect memory, input/output ports, and the ability to execute certain machine instructions. User applications typically run in ring 3 (least privileged), while system software such as operating systems run in ring 0 (most privileged).

Possible approaches for extracting state information in the presence of untrusted software, including potentially compromised user applications and operating systems, are currently inadequate. Many newer computing platforms are implemented with a secure area of the processor, which can be referred to as a trusted execution environment (TEE). A TEE can protect the confidentiality and integrity of data and code loaded inside protected memory. TEEs, however, generally do not have access to the ring 0 state of a processor. Most state information is retrievable by software running in ring 0 and not from ring 3, but TEEs and security controllers do not have the capability of reading the ring 0 state of the processor. In particular, model specific registers (MSRs) are not accessible from ring 3. Consequently, neither TEEs nor security controllers are capable of fully reporting the state information of processor cores.

Other approaches are also inadequate. An operating system typically has a high privilege level (e.g., ring 0) and can be requested to provide certain state information. Like other software, however, operating systems are susceptible to malware. A remote server requesting state information from a computing platform has no way of knowing whether the operating system of that platform is infected with malware and further, has no way of verifying the integrity of state information obtained by the operating system.

A virtual machine monitor (VMM) is also capable of reading state information, but not all computing platforms have VMMs. For platforms that do have VMMs, a secure launch is needed for reporting state information that can be trusted by the requester. In one scenario, a Trusted Execution Technology (TXT) launch can be used for the VMM to be trusted in the presence of System Management Mode (SMM) and SMI Transfer Monitor (STM) and to protect itself from malware. Thus, a VMM-based solution needs trust in a large software base that is not consistently available. Moreover, having a secure boot, TXT, and SMM mitigations enabled is a heavyweight and expensive solution that may not be economically feasible in many scenarios.

Currently, user applications and other lower-privileged software on a computing platform cannot obtain state information that is often needed by IT services or authorized entities that desire such information. Such information may be needed by IT services, for example, for provisioning the computing platform and/or for providing services to the computing platform. Moreover, operating systems can be susceptible to malware, and IT services (or entities) that request state information do not currently have a way of verifying the integrity of the received state information.

A communication system 100, as shown in FIG. 1, resolves many of the aforementioned issues (and more). The simplified block diagram of FIG. 1 illustrates communication system 100 for securely reporting state information of a computing platform 125 of a device 120 to a remote server 150. In an embodiment of communication system 100, the device securely reports state information 133 of the computing platform to the remote server. Device 120 and remote server 150 may exchange communications via a network 110 to establish a shared key 137, 157. The remote server may request selected state information from untrusted software 121 provisioned on the device. A processor 130 of the computing platform exposes a platform state instruction 132 to the untrusted software. The platform state instruction can be executed by the untrusted software, even if the software is running in an unprivileged level, to obtain the selected state information from the computing platform at that time. The selected state information is obtained based on a request structure 142 indicating which state information is to be obtained. A state information report 144 can be generated using the obtained state information and then sent to the remote server. In one embodiment, the state information report can include a response structure 146 containing the obtained state information and can also include a response signature 148. The response signature can be generated by using a cryptographic algorithm 122 (e.g., hash algorithm, encryption algorithm) and shared key 137 to transform the response structure into a cryptographic value. In at least one embodiment, the state information report may also include the request structure. In this embodiment, the response signature may be generated based on transforming the response structure combined with the request structure. The remote server can use a cryptographic algorithm 152 and shared key 157 to verify the integrity of the response structure in the state information report.

Embodiments of communication system 100 for securely reporting platform state information to a remote server offer significant advantages. Embodiments described herein enable entities, such as communication service providers (CSPs) with IT services running on servers locally or in a cloud infrastructure, to ascertain the trustworthiness of a computing platform without requiring the presence of a trusted execution environment for this purpose. Furthermore, these entities can enforce and ascertain compliance while running untrusted software, including both user applications and system applications such as an operating system. If a state information report is maliciously modified by an infected operating system or other untrusted software retrieving the requested state information, the receiving entity (e.g., remote server of a CSP) can perform a verification process on the received state information report and take appropriate action if the verification process fails. This facilitates open systems in which zero-touch provisioning can securely flourish. Furthermore, such embodiments enable IT services to be provided to devices that are not necessarily provisioned with a large software base of features (e.g., secure boot, TXT, SMM mitigations) that may otherwise be required for the devices to receive those IT services.

A brief discussion is now provided about some of the possible infrastructure that may be included in communication system 100. With reference to communication system 100 of FIG. 1, one or more networks, such as network 110, can facilitate communication between device 120 and remote server 150. Device 120 can include untrusted software 121, a cryptographic algorithm 122, and computing platform 125. One or more processors, such as processor 130 and one or more memory elements, such as memory element 140 form, at least in part, the computing platform of the device. Processor 130 provides a platform state instruction 132, a cache 136, and registers 134 containing state information 133 and memory addresses 135. A shared key 137 may be pushed into cache 136 once the shared key is established between device 120 and remote server 150. A request structure 142 (which may optionally be signed) and a state information report 144 containing a response structure 146 and response signature 148 may be stored in memory element 140. Some computing devices may be provisioned with a trusted execution environment (TEE) 139, which runs in the processor using a protected memory and may be allocated in a protected portion of memory element 140. In some embodiments where the computing device is configured with a TEE, shared key 137 may be stored in the protected memory rather than (or in addition to) being stored in cache 136.

Remote server 150 may include a memory element 158, a processor 159, an information technology (IT) service 151, an authentication engine 154, and a state detection engine 156. IT service 151 may be configured to coordinate with or may be integrated with authentication engine 154 and/or state detection engine 156. The state detection engine may be configured to run a cryptographic algorithm 152 that uses a shared key 157 corresponding to shared key 137 of device 120.

Generally, communication system 100 can include any type or topology of networks, indicated by network 110. Network 110 represents a series of points or nodes of interconnected communication paths for receiving and sending network communications that propagate through communication system 100. Network 110 offers a communicative interface between nodes and may be configured as any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment, or any suitable combination thereof. Network 110 can use any suitable technologies for communication including wireless (e.g., 3G/4G/5G/nG network, WiFi, Institute of Electrical and Electronics Engineers (IEEE) Std 802.11 ™-2012, published Mar. 29, 2012, WiMax, IEEE Std 802.16™-2012, published Aug. 17, 2012, Radio-frequency Identification (RFID), Near Field Communication (NFC), Bluetooth™, etc.) and/or wired (e.g., Ethernet, etc.) communication. Generally, any suitable means of communication may be used such as electric, sound, light, infrared, and/or radio (e.g., WiFi, Bluetooth, NFC, etc.).

Network traffic (also referred to herein as 'network communications' and 'communications'), can be inclusive of packets, frames, signals, data, objects, etc., and can be sent and received in communication system 100 according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). The term 'data' and 'information' as used herein, refers to any type of binary, numeric, voice, video, textual, photographic, or script data, or any type of source or object code, or any other suitable information in any appropriate format that may be communicated from one point to another in computing systems (e.g., hosts, devices, endpoints, servers, computing devices, computing platforms, etc.) and/or networks. Additionally, messages, requests, responses, replies, queries, etc. can be forms of network communications.

Device 120 can be provisioned in any suitable network environment capable of network access (e.g., via network 110) to a remote server (e.g., remote server 150). Device 120 is intended to represent any type of device capable of utilizing information technology (IT) services provided over a network. Devices can include, but are not limited to, servers, desktops, laptops, workstations, tablets, mobile devices, smartphones, computing devices, etc. (any of which includes a computing platform that may include physical hardware or a virtual implementation on physical hardware), or any other device, component, element or object capable of initiating voice, audio, video, media, data, or information exchanges within communication system 100. A device may include any suitable hardware, software, firmware, circuitry, components, modules, interfaces, or objects that facilitate the operations thereof. Some devices may include virtual machines adapted to virtualize execution of a particular operating system. Additionally, devices may be inclusive of appropriate algorithms and communication protocols that allow for the effective exchange of data or information. At least some devices may also be inclusive of a suitable interface to a human user (e.g., display screen, etc.) and input devices (e.g., keyboard, mouse, trackball, touchscreen, etc.) to enable a human user to interact with the device.

Remote server 150 can also be provisioned in any suitable network environment capable of network access (e.g., via network 110) to allow the remote server to provide IT services to one or more devices (e.g., device 120). Remote servers, such as remote server 150, are network elements, which may encompass one or more servers, routers, switches, gateways, bridges, load balancers, firewalls, inline service nodes, proxies, proprietary appliance, servers, processors, or modules (any of which may include physical hardware or a virtual implementation on physical hardware) or any other device, component, element, or object operable to exchange information in a network environment. A network element may include any suitable hardware, software, firmware, circuitry, components, modules, interfaces, or objects that facilitate the operations thereof. Some network elements may include virtual machines adapted to virtualize execution of a particular operating system. Additionally, network elements may be inclusive of appropriate algorithms and communication protocols that allow for the effective exchange of data or information.

In at least one embodiment, device 120 and remote server 150 may authenticate to each other using any suitable authentication or attestation techniques. In one example, TEE 139 of device 120 is used to authenticate to IT service 151 of remote server 150 via authentication engine 154. An example of a TEE is an enclave, which can be established as a protected area of execution in a process. Enclaves are isolated memory regions of code and data. Applications can use special central processing unit (CPU) instructions to create enclaves and to control entries into and exits from running in an enclave mode in which the isolated memory regions can be accessed. Thus, enclaves can be protected from code that is not stored in the enclave. A TEE such as Intel® Software Guard Extensions (SGX), provides a mechanism for attestation of an enclave to a remote server. In this implementation, an application starts and launches an enclave. The enclave uses a processor enhanced privacy identifier (EPID) algorithm for attestation to the remote server.

In at least one embodiment, device 120 and remote server 150 are configured to establish a shared key (e.g., 137, 157). In a particular example, processor 130 of device 120 and state detection engine 156 of remote server 150 may establish the shared key. The key may be secret or not publicly available, such that its contents are known only to the device and the remote server. In one example, the key may be embodied as a 128-bit or 256-bit symmetric key stored in (or otherwise accessible to) both the device and the remote server. It will be apparent that any number of known or new techniques may be used to establish a shared key between the device and remote server. In one possible implementation using SGX, after the attestation, the enclave (e.g., protected memory) receives a key from processor 130 using an EGETKEY instruction, which has a ring 3 privilege level. The processor uses an RDRAND instruction to generate the key. RDRAND is an instruction that is used to return random numbers from an on-chip random number generator that is seeded by an on-chip entropy source. The key is then provided to the enclave and the enclave can send the key to the state detection engine of the remote server.

In another possible implementation, Diffie-Hellman protocol is run in TEE 139 between the device and the remote server to establish the shared key. Diffie-Hellman is an algorithm that is used to establish a shared secret between two entities, where the secret cannot be determined by observing the communication between the entities. In an embodiment using Diffie-Hellman, device 120 and remote server 150 first agree publicly on a prime number P and a base number N. Each entity selects a private exponent, such as A for the device and B for the remote server. Device 120 calculates: $J=N^A \pmod P$. The result J is sent to the remote server. Remote server 150 calculates: $K=N^B \pmod P$. The result K is sent to the device. Device 120 then takes the received result K and calculates: $K^A \pmod P$. The result is the shared secret (e.g., key 137), which can be pushed into cache 136 of processor 130. In other embodiments, the key may be provisioned by TEE 139 in an enclave (e.g., protected memory) in device 120. Similarly, remote server 150 takes received result J and calculates: $J^B \pmod Y$. The result (e.g., key 157) is the same shared secret (e.g., key 137) calculated by the device and can be stored in a memory element 158 of remote server 150, or any other memory element or storage accessible to the remote server.

Untrusted software 121 is intended to represent software configured to run in a lower privilege level, such as ring 3, or in any higher privilege level, such as ring 0. Ring 3 applications often include user applications, while ring 0 applications typically include system software such as an operating system. Untrusted software 121 can be configured to receive, from a remote server, a request for state information from the processor 130. The request may contain a request structure (e.g., 142) and optionally a request signature. In other embodiments, the untrusted software may generate the request structure.

A request structure, such as request structure 142) may contain various fields. In at least one embodiment, some of the fields may be implemented as a bitmask with one or more one-bit fields that correspond to respective fields in one or more registers (e.g., 134) that contain state information of their computing platform (e.g., 125). When a request structure is generated, each field in the bitmask that corresponds to a field in a register containing desired state information can be set to one. Each field in the bitmask that corresponds to a field in a register not containing desired state information may remain (or be set to) zero. Examples of state information that may be desired by an IT service can include, but are not limited to, information that indicates one or more of whether the platform was booted using a secure boot, whether memory encryption is enabled on the platform, whether system management mode (SMM) is enabled on the platform, whether instructions such as supervisor mode access/execution protection (SMEP/SMAP) are being used on the platform, whether virtualization technology (VTx) is enabled on the platform, whether secure fingerprint has been used to login to the machine, and whether the platform has a security controller enabled on it.

In other implementations, untrusted software (e.g., 121) running on the computing platform generates the request structure, such as request structure 142. For example, the remote server may request state information without specifying the particular state information to be reported. In this scenario, the request structure may be generated with a predetermined one or more bits in the bitmask being set to one, where the predetermined one or more bits correspond to fields containing default state information to be reported.

The state information represented by bits in a bitmask of a request structure (and a corresponding response structure) may be implementation specific. For example, a request structure (e.g., 142) for one type of computing platform (e.g., 125) may contain different bits than the bits in a request structure for another type of computing platform. In addition, each IT service may want a different set of state information from a given computing platform.

In one or more embodiments, processor 130 is configured with an instruction set architecture comprising platform state instruction 132 (e.g., GET_STATE), which can be exposed to untrusted software 121 on device 120. The untrusted software can execute the platform state instruction regardless of the privilege level assigned to the untrusted software. The platform state instruction is a read only instruction that can be executed from software having a lower privilege level, such as ring 3, or any higher privilege level, such as ring 0. The platform state instruction does not change the state of the machine. In one example using CPU extensions offered by Intel Corporation (e.g., Virtual Machine eXtensions (VMX)), if the instruction is invoked from the VMX root mode, then the instruction can return the host state of the processor. Otherwise, the instruction can return the guest state of the processor. A flag may indicate whether the host state or the guest state is being reported.

The platform state instruction can include a first operand that specifies a first register containing the address of the request structure and a second operand that specifies a second register containing the address of a state information report to be created by the platform state instruction. When executed, the platform state instruction obtains the request structure (e.g., 142), which enumerates a list of state information (e.g., bit fields in registers, model-specific registers, etc.) on which the processor is to report, and writes a response structure (e.g., 146) with the collected data. The response structure can be generated by the instruction and stored in the state information report. Also, a response signature (e.g., 148) may be generated and stored in the state information report. In at least one embodiment, the response signature can be generated by applying a cryptographic algorithm 122 with shared key 137 to the response structure to transform the response structure into a cryptographic value. It should be noted that the request structure, response structure, and state information report can be stored in any available memory such as memory element 140.

In at least one embodiment, state information report 144 also contains the request structure. In this embodiment, the response signature can be generated by applying the cryptographic algorithm 122 and shared key 137 to the response structure and the request structure to transform the response structure and the request structure into a cryptographic value. For example, the response structure and the request structure may be concatenated and the cryptographic algorithm and shared key may be applied to the concatenated value. The response signature may be stored in the state information report. In addition, it should be noted that both the response structure and the request structure also contain the same nonce to ensure that the untrusted software cannot replay an older response structure and the included request structure.

A cryptographic value is intended to mean a value that has been transformed from an original value such that it cannot independently be converted back to its original value. Some types of cryptography (e.g., hashing) involve one-way transformations in which the resulting cryptographic value cannot be converted back to the original value. In some other types of cryptography (e.g., encryption/decryption), a cryptographic value can be converted back to the original value (or decrypted) using a shared symmetric key if symmetric encryption was used or using one key of a key-pair if asymmetric encryption was used.

Any suitable cryptographic technique may be used to generate a response signature from the response structure, which may be optionally combined with the request structure, and to verify the response structure received at the remote server from the device. In at least one embodiment, an authentication function such as hash-based message authentication code (HMAC) may be used. HMAC involves a cryptographic hash function and a cryptographic key. It may be used to verify both data integrity and the authentication of a message. A variety of cryptographic hash functions may be used by the H MAC. For example, a secure hash algorithm (e.g., SHA-1, SHA-2, SHA-3, etc.) or Merkle-Damgard algorithm (e.g., MD5, etc.) may be used by the HMAC. In HMAC processing of a message (e.g., state information report 144), the shared key may be used to derive an inner key and an outer key. Two passes of the hash algorithm may then be made using the inner and outer keys. The first pass of the hash algorithm produces an internal hash value derived from the message and the inner key. The second pass produces the final hash value in this embodiment. In the second pass, the final hash value is derived from the internal hash value and the outer key.

In other embodiments, suitable encryption/decryption algorithms may be used to generate a signature from the response structure, which may be optionally combined with the request structure. In these embodiments, symmetric key cryptography or asymmetric key cryptography may be implemented. In symmetric key cryptography, a secret (symmetric) key may be used by an encryption algorithm to encrypt the response structure (and optionally the request structure), and the same secret key may be used by a corresponding decryption algorithm to decrypt the encrypted value. The response structure (or a derivation thereof) may be verified against the decrypted signature (or a derivation thereof) In asymmetric key cryptography, an asymmetric key-pair may be used for the encryption and subsequent decryption. Establishing the key-pair may be achieved using any suitable known techniques.

In one example implementation, remote server 150 may be provisioned in an IT infrastructure that is locally managed. Such remote servers may be on-site with computing devices to which IT services are provided or off-site and accessed via a virtual private network (VPN) or other suitable network. In another example implementation, a remote server may be provisioned in a cloud infrastructure managed by an IT services provider (e.g., Google, Amazon, etc.). IT service 151 can include, for example, Internet connectivity, enterprise application software, media content, security software, network administration, and/or compliance monitoring. In at least some scenarios, IT service 151 can be part of a software as a service (SaaS) model to host applications and make the applications available to customers of devices such as device 120.

In at least one embodiment, when a connection has been established between device 120 and remote server 150, state detection engine 156 can initiate a request for state information and send the request to untrusted software 121 of device 120. The particular state information that is requested may be based on the particular computing platform (e.g., 125) of the device and the particular IT service (e.g., 151) of the remote server. In one implementation, state detection engine 156 generates the request structure 142 to indicate which state information is being requested. A bitmask in the request structure may include bits that correspond to respective fields of one or more registers associated with processor 130, where the fields contain state information. One or more bits in the bitmask may be set to indicate which fields contain state information that is being requested.

In other embodiments, state detection engine 156 may request state information without specifying particular state information to be reported. In this scenario, untrusted software 121 may generate the request structure based on a predefined or default set of fields containing state information to be provided to state detection engine 156.

An optional request signature may be generated for a request structure. For example, when request structure is generated at remote server 150, the request signature may be generated by using cryptographic algorithm 152 with shared key 157 to transform the request structure into a cryptographic value. In another example, when request structure is generated at device 120, the request signature may be generated by using cryptographic algorithm 122 with shared key 137 to transform the request structure into a cryptographic value.

State detection engine 156 may also receive a response from untrusted software 121 once the requested state information has been obtained and a state information report (e.g., 144) has been generated at device 120. The response can include state information report 144. In at least one embodiment, state detection engine 156 can verify the integrity of a response structure in the state information report by applying cryptographic algorithm 152 and shared key 157 to the response structure, which includes the nonce.

In one example using HMAC authentication and verification, the cryptographic algorithm 152 on the remote server is the same as the cryptographic algorithm on the device 122. Accordingly, cryptographic algorithm 152 and shared key 157 generate a verification signature based on the response structure in the received state information report, and then compare the response signature to the verification signature. In another embodiment previously described herein, the request structure is also included in the state information report 144 and is combined with the response structure to generate the response signature at the device. In this embodiment, cryptographic algorithm 152 and shared key 157 generate a verification signature based on the response structure combined with the request structure from the received state information report, and the verification signature is compared to the response signature.

If the verification signature and response signature match (or otherwise correspond) then the integrity of the response structure is verified. If the verification signature and the response signature do not match (or do not otherwise correspond), then the integrity of the response structure is not verified. If the response structure is not verified, then the IT service can block its services from device 120, or can take any other appropriate action (e.g., send a message to a user of the device or push to a log file an alert that state information of the computing platform may have been compromised and/or that the IT service will be blocked until the issue is rectified, etc.). If the response structure is verified, then IT service 151 of remote server 150 can be provided to device 120.

It should be noted that in at least one embodiment, device 120 and remote server 150 include software to achieve or facilitate the activities related to requesting and securely reporting platform state information as outlined herein. In one example, each of these elements can have an internal structure (e.g., a processor 130, 159, a memory element 140, 158, etc.) to facilitate at least some of the operations described herein. In other embodiments, these requesting and reporting activities may be executed externally to these elements or included in some other network element to achieve the intended functionality. Alternatively, device 120 and remote server 150 may include this software (or reciprocating software), which can coordinate with other network elements and/or computing devices to achieve the operations as outlined herein. In yet other embodiments, one or more devices may include any suitable algorithms, hardware, firmware, software, circuitry, components, modules, logic, interfaces, or objects that facilitate the operations thereof.

Figure 2:
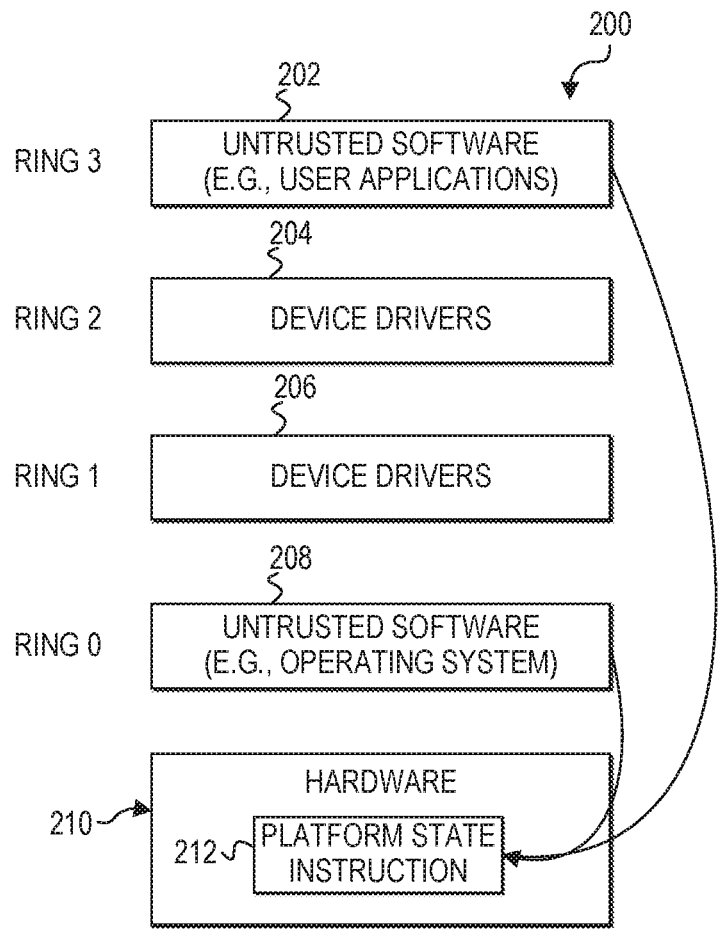
FIG. 2 is a simplified block diagram illustrating software privilege levels for an instruction to obtain platform state information according to at least one embodiment.

Turning to FIG. 2, a block diagram is provided to illustrate example privilege levels of computing architecture in a device. Hardware 210 represents hardware of a computing platform (e.g., 125), such as a processor (e.g., 130) and a memory element (e.g., 140). In this example, four privilege levels are provided from the most privileged (ring 0) to the least privileged (ring 3). Some architectures use only ring 0 and ring 3, but others may use intermediate privilege levels (ring 1, ring 2). At any given time, a processor is running in a particular privilege level, which determines what is allowed and not allowed by the software. Untrusted software 202 in ring 3 typically includes user applications, which cannot access state information in registers of the processor. Intermediate privilege levels (ring 2, ring 1), if present, may include device driver applications 204, 206 and potentially other applications.

Untrusted software 208 in the highest privilege level (ring 0) can include kernel code such as the operating system (OS) of the device. An OS and other kernel code (e.g., device drivers) in ring 0 may execute machine instructions that access registers, memory, and/or input/output ports. Although an OS and other kernel code may have the highest privilege level for running in hardware 210, because the OS and other kernel code can be susceptible to malware infections, they are considered untrusted by remote entities (e.g., remote server 150). For example, a remote server that receives state information from an operating system of a device does not know if the operating system has been compromised by malware, and therefore, whether the received state information is corrupt.

In embodiments described herein, a platform state instruction 212 is exposed by the processor in hardware for retrieving selected state information from the processor. Platform state instruction 212 is one representation of platform state instruction 132 of FIG. 1. The platform state instruction is read only in at least one embodiment and can be exposed to untrusted software at any privilege level for execution. Accordingly, platform state instruction 212 can be exposed to untrusted software 202 in ring 3 and untrusted software 208 in ring 0. If applications run in intermediate privilege levels, the instruction can be exposed to them as well. Thus, both user applications and operating systems, for example, can execute platform state instruction 212 to obtain selected state information of a processor.

Figure 3:
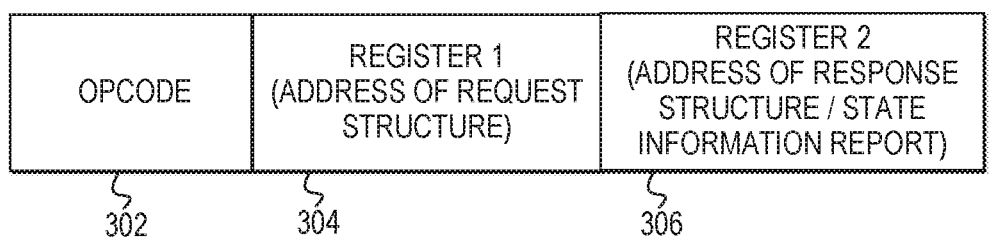
FIG. 3 is a block diagram illustrating an example format for an instruction to obtain platform state information according to at least one embodiment.

FIG. 3 illustrates an example format 300 of a platform state instruction (e.g., 132, 212). The platform state instruction format can include a field for an opcode 302, a field for identification of a first register 304 (Register 1), and a field for identification of a second register 306 (Register 2). Opcode 302 is an instruction syllable that is the portion of a machine language instruction that specifies the operation to be performed. For example, the opcode could be GET_STATE. Registers 1 and 2 can contain memory addresses (e.g., 135) of the request structure and response structure, respectively. Register 1 may hold the address of the request structure in memory. Register 2 may contain the address of the response structure in memory. In at least one embodiment, the response structure is included in a state information report. Therefore, the address of the state information report may be the same as the address of the response structure. In this implementation, the response structure may be stored in memory at the address contained in register 2. A response signature and optionally the request structure may be added to the response structure such that the response structure, the request structure, and the response signature form the state information report.

FIGS. 4A-4C are tables illustrating example formats of data structures for implementing secure reporting of platform state information in communication system 100. FIG. 4A shows a signed request structure 400, which includes a request structure 401 with a signature field 406. Request structure 401 represents one possible example of request structure 142 in FIG. 1. In at least one embodiment, request structure 401 includes a nonce field 402, which is an arbitrary number that is different in each request structure associated with the same IT service. If untrusted software (e.g., operating system, user application) on a device (e.g., 120) generates a request structure, then the nonce may be different in each request structure generated by the untrusted software. In the example request structure 401, the nonce field 402 contains bits 1101 (i.e., decimal value 13) with leading zeroes to fill 64 total bits.

A bitmask 404 in request structure 401 corresponds to state information of a computing platform that may be reported to a remote server. In at least one embodiment, 1-bit fields are provided in bitmask 404. Each 1-bit field corresponds to a respective field in a register associated with a computing platform from which state information may be requested and reported. This example bitmask 404 includes register fields of XD (execute disable), VTx (virtualization technology), VTd, SMM (system management mode), and UMIP (user-mode instruction prevention). In this example scenario, bitmask fields XD, VTx, VTd, and SMM are each set to 1, and bitmask field UMIP is set to 0. Based on this request structure, the state information being requested includes whether the execute disable (XD) feature is enabled, whether the virtualization (VTx) features are enabled, and whether the system management mode (SMM) feature is enabled. The request structure does not require a report as to whether the user-mode instruction prevention (UMIP) feature is enabled.

Signed request structure 400 also includes signature field 406 having a 512-bit size. In at least one embodiment, signature field 406 may contain a request signature that is generated by using a cryptographic algorithm (e.g., 152, 122) with a shared key (e.g., 157, 137) to transform (e.g., hash, encrypt, etc.) the request structure 401 into a cryptographic value. In at least one embodiment, the transformation may be performed on fields 402 and 404 of request structure 401.

FIG. 4B shows a signed response structure 410, which includes a response structure 411 and a signature field 416. Response structure 411 represents one possible example of response structure 146 in FIG. 1. Response structure 411 may be generated by the execution of a platform state instruction (e.g., 132) based on request structure 401. Response structure 411 includes a nonce field 412, which contains the same value contained in nonce field 402 of request structure 401. In this example, nonce field 412 contains bits 1101 (i.e., decimal value 13) with leading zeroes to fill 64 total bits.

Response structure 411 also includes a bitmask 414, which can include the same 1-bit fields included in request structure 401. In this example scenario, the bits that are set to a value of 1 in response structure 411 by the platform state instruction include bits in the XD field and the SMM field. Based on bitmask 414 in response structure 411, the execute disable (XD) feature and the system management mode (SMM) feature are enabled on the computing platform from which the platform state instruction obtained the state information. Also, in response structure 411, the VTx field and the VTd field contain values of zero. Thus, virtualization features are not currently enabled on the processor. The UMIP field also contains a zero. However, UMIP feature was not selected in the request structure 401. Accordingly, even though the UMIP field in the response structure is zero, it is unknown whether the user-mode instruction prevention feature is enabled on the processor since the platform state instruction did not retrieve the UMIP value from the appropriate register.

Signed response structure 410 also includes a signature field 416 having a 512-bit size. In at least one embodiment, signature field 416 may contain a response signature that is generated by using a cryptographic algorithm (e.g., 122) with a shared key (e.g., 137) to transform (e.g., hash, encrypt, etc.) response structure 411 into a cryptographic value. Thus, fields 412 and 414 may be used to produce the response signature. In at least some embodiments, a combination of response structure 411 and request structure 401 may be used to produce the response signature. In such an embodiment, signature field 416 contains a response signature that is generated by using a cryptographic algorithm (e.g., 122) with a shared key (e.g., 137) to transform the response structure 411 and request structure 401 into a cryptographic value. The response structure and the request structure may be combined in any suitable manner (e.g., concatenated, etc.) before the transformation is performed. In addition, the signature field of the request structure may optionally be included with the response structure and the request structure when the cryptographic algorithm is applied.

Although specific fields in particular registers of an example computing platform are illustrated in FIGS. 4A-4B, it should be apparent that any number of other fields and registers, or alternative combinations of other fields and registers could be used to generate a request structure and, upon execution of platform state instruction, a response structure. Certain IT services or IT providers may require customer devices to have particular configurations (e.g., security features, etc.). Thus, request structures and corresponding response structures may be implementation-specific, platform-specific, and/or IT service/vendor-specific.

FIG. 4C shows an example state information report 430, which represents one possible example of state information report 144 in FIG. 1. In one example, state information report 430 includes response structure 411 and response signature from signature field 416. Optionally, state information report 430 may also include request structure 401 (with or without request signature from signature field 406).

Figure 5:
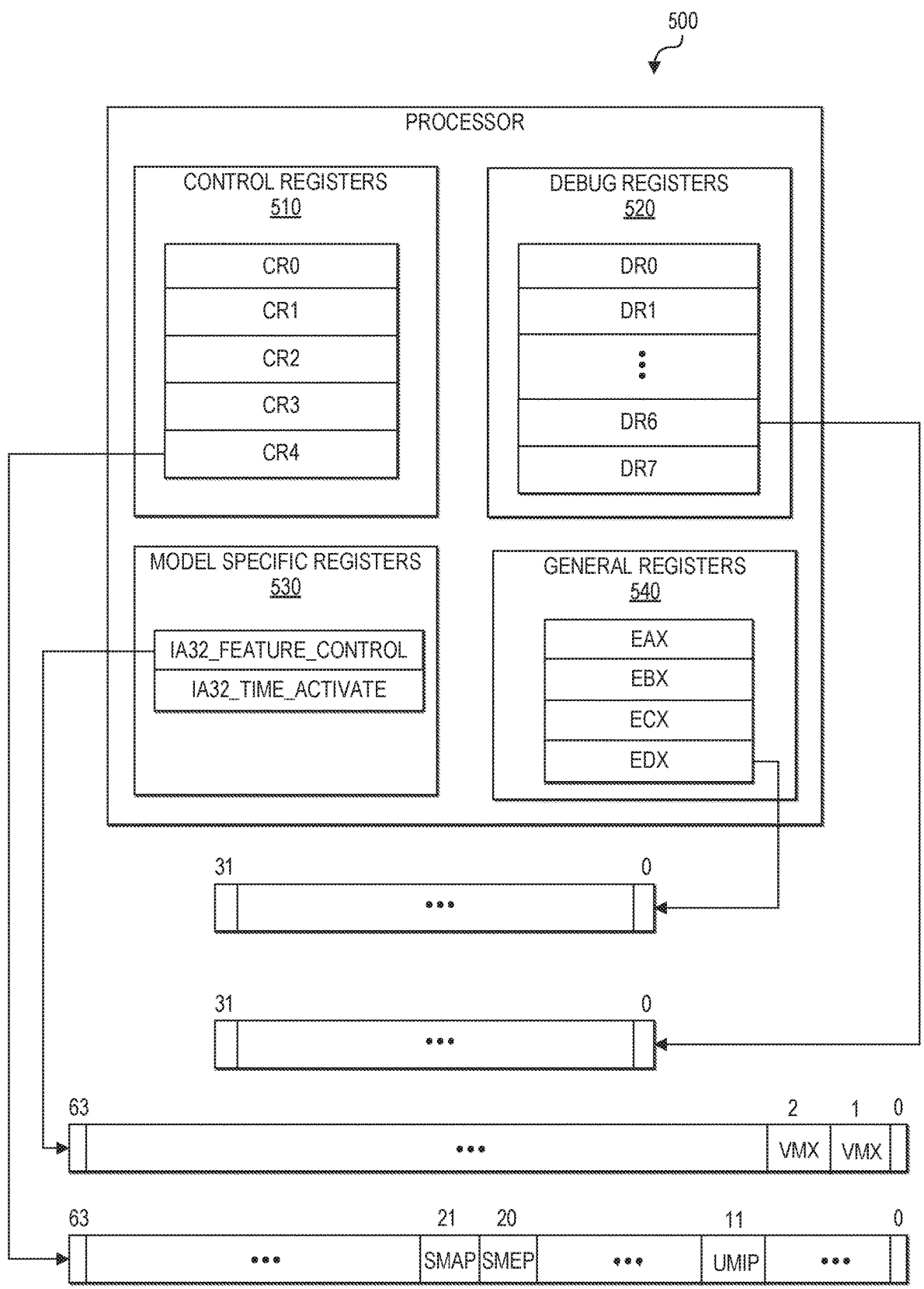
FIG. 5 is a block diagram illustrating example registers that may be used to implement the secure reporting of platform state information according to at least one embodiment.

FIG. 5 is a block diagram illustrating example registers of a processor 500 of a computing platform that may be accessed to obtain desired state information of the computing platform. In this example, control registers 510, debug registers 520, model specific registers 530, and general registers 540 are provided in a processor 500. Control registers 510 may include CR0 through CR4 registers. Debug registers 520 may include DR0 through DR7 registers. Model specific registers 530 may include IA32_FEATURE_CONTROL register and IA32_TIME_ACTIVATE register. General registers 540 may include EAX, EBX, ECX, and EDX registers. One or more of these registers may include one or more fields containing state information that can be reported to a remote server (e.g., by an IT service). In at least one embodiment, each field may be defined by a single bit.

In one example, CR4 may include 64 bits with several fields that indicate security configurations or statuses requested by one or more IT services. For example, bit 21 (CR4.SMAP) indicates whether SMAP is enabled, bit 20 (CR4.SMEP) indicates whether SMEP is enabled, and bit 11 (CR4.UMIP) indicates whether UMIP is enabled. In another example, IA32_FEATURE_CONTROL MSR indicates whether VTx (virtualization of the processor) is enabled. Bits 1 and 2 (VMX) of IA32_FEATURE_CONTROL MSR indicate whether virtual machine extensions (VMX) are enabled within or outside safer mode extensions (SMX). In a further example not show, IA32_TIME_ACTIVATE_MSR indicates whether TME is enabled. Each of the fields in these registers are typically only accessible from ring 0. In one or more embodiments described herein, however, these fields may be read, but not modified or deleted, by a platform state instruction that is exposed to ring 3 software in addition to ring 0 software.

Figure 6:
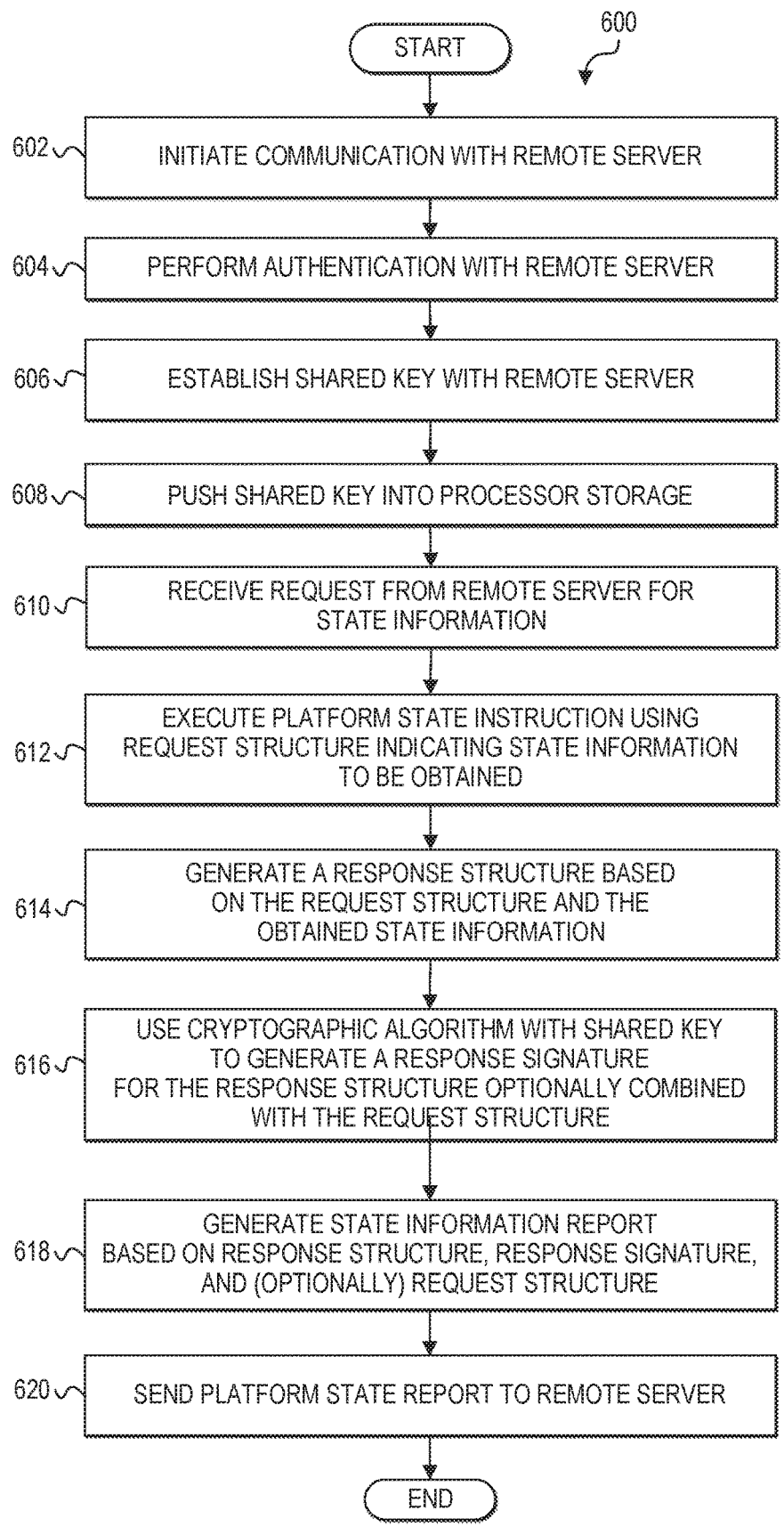
FIG. 6 is a simplified flow chart illustrating example operations associated with a communication system for securely reporting platform state information according to at least one embodiment.

Turning to FIG. 6, FIG. 6 is a simplified flowchart that illustrates a possible flow 600 of operations associated with secure reporting of platform state information to a remote server in accordance with embodiments herein. In at least one embodiment, a set of operations corresponds to activities of FIG. 6. Device 120, or a portion thereof, may utilize at least a portion of the set of operations. Device 120 may comprise means such as computing platform 125 with processor 130 and memory element 140, for performing the operations. In an embodiment, one or more operations of flow 600 may be performed by untrusted software 121, cryptographic algorithm 122, and platform state instruction 132 executing on computing platform 125.

At 602, a device (e.g., 120) may initiate communication with remote server (e.g., 150). At 604, an authentication is performed with the remote server. Any suitable technique or process may be used to perform the authentication. In one implementation, a computing platform (e.g., 125) of the device can be provisioned with a TEE (e.g., 139), and an enclave can attest itself to an IT service (e.g., 151) of the remote server using a processor enhanced privacy identifier (EPID) algorithm for attestation. In another implementation, the computing platform can be provisioned with a security controller, which can attest itself to the IT service of the remote server.

At 606, a shared key (e.g., 137, 157) is established between the device and the remote server. In one possible implementation, the shared key is a symmetric key that may be generated by running a Diffie Hellman protocol in a TEE (e.g., 139) between the device and the remote server. In another possible implementation, a TEE provides a mechanism for attestation of an enclave running in the device to the remote server. Upon successful completion of the attestation, the enclave can receive a key from a processor (e.g., 130) in the device using a machine instruction that is accessible to lower privilege level applications (e.g., in ring 3). The enclave can then send the key to the IT service. An example of a suitable machine instruction for this technique is EGETKEY, which is a user instruction to create a cryptographic key and is available in Intel® Software Guard Extensions Instructions. It will be apparent that any number of techniques may be used to establish a shared key between the two entities, and the examples disclosed herein are possible options that have been provided for illustrative purposes, but are not intended to be limiting.

At 608, the shared key may be stored in the processor of the device. For example, an instruction that is used to generate the shared key (e.g., EGETKEY) may be configured to push the shared key into hardware storage of the processor, such as cache 136, for subsequent use. In other implementations, the shared key may be stored in protected memory, such as protected memory of a TEE.

At 610, a request is received by the device from remote server for state information of the computing platform. In one embodiment, a request structure may be generated by the remote server (e.g., by state detection engine 156). The request structure identifies particular items of state information being requested. In at least one implementation, a bitmask may be used in the request structure with items of state information corresponding to individual bits. The bits corresponding to the selected items of state information that are being requested may be set to one and the bits corresponding to the unselected items of state information that are not being requested may be set to zero. In addition, the remote server may generate a nonce (e.g., a one-time arbitrary value), which is included in the request structure. Additionally, in at least some embodiments, a request signature may be generated from the request structure by applying a cryptographic algorithm (e.g., hash function, encryption algorithm) with the shared key to the request structure at the remote server to transform the request structure into a cryptographic value. The request signature may be included in the request to provide a signed request structure.

In other implementations, the request received from the remote server may not include the request structure, may include a request structure with no selections in the bitmask, or may otherwise indicate a request for predetermined or default state information. In this scenario, a request structure may be generated by untrusted software on the device based on predefined or default state information to be requested. The request structure may be generated with one or more bits in the bitmask being set to one, where the one or more bits correspond to one or more fields in registers containing the predetermined or default state information to be requested. In another scenario, the items of state information to be requested may be obtained by untrusted software from another local or remote source.

At 612, the untrusted software, which may have a ring 3 privilege level, can execute the platform state instruction (e.g., 132) based on the request structure. The request structure specifies which items of state information are requested. The platform state instruction may identify a first register containing a memory address of the request structure and a second register containing a memory address of a state information report to be generated based, at least in part, on the request structure and the obtained information. The platform state instruction reads the request structure located at the memory address contained in the identified first register. State information is obtained from registers based on the items of state information specified in the request structure. For example, state information may be obtained from fields in registers of the processor, where the fields correspond to bits that are set in the bitmask of the request structure.

At 614, a response structure is generated based, at least in part, on the request structure and the obtained state information. For example, if a bit in the bitmask representing SMEP is set, then the value of the SMEP bit in register CR4 can be obtained and stored in a field of the response structure that represents SMEP. In at least one embodiment, the response structure may have the same format as the request structure.

The platform state instruction may also store the nonce value of the request structure in a nonce field of the response structure. Storing the same nonce value in the response structure that was stored in the request structure helps prevent untrusted software from replaying an older response structure. In at least some embodiments, the request structure and the response structure may have the same format, but potentially different values based on the values of the state information that is obtained.

Once all of the requested state information is obtained and stored in the response structure, at 616, a response signature can be generated by applying a cryptographic algorithm with the shared key to the response structure to transform the response structure into a cryptographic value. Optionally, in some embodiments, the response signature can be generated by applying the cryptographic algorithm with the shared key to the response structure combined with the request structure to transform the response structure combined with the request structure into a cryptographic value.

At 618, a state information report is generated based on the response structure, the response signature, and optionally, the request structure. In at least one embodiment, the data can be stored sequentially in memory at the memory address contained in the second register identified in the platform state instruction.

At 620, the untrusted software can send the state information report to the remote server. If the remote server determines that the computing platform is not properly configured according to the IT service's needs or preferences, or that its operational state does not satisfy the IT service's needs or preferences, then IT services may not be provided to the device from the remote server. For example, if the untrusted software is provisioned by the IT service, then the untrusted software may be blocked from execution on the device and/or removed from the device. In another example, if the untrusted software is the operating system of the device, then the IT service may not be provided to the device (e.g., local IT service applications may not be installed). Also, appropriate alerts may be sent to the device and/or any other message channel (e.g., email, log file, text message, etc.) indicating the problem with the state information that was received from the device.

Figure 7:
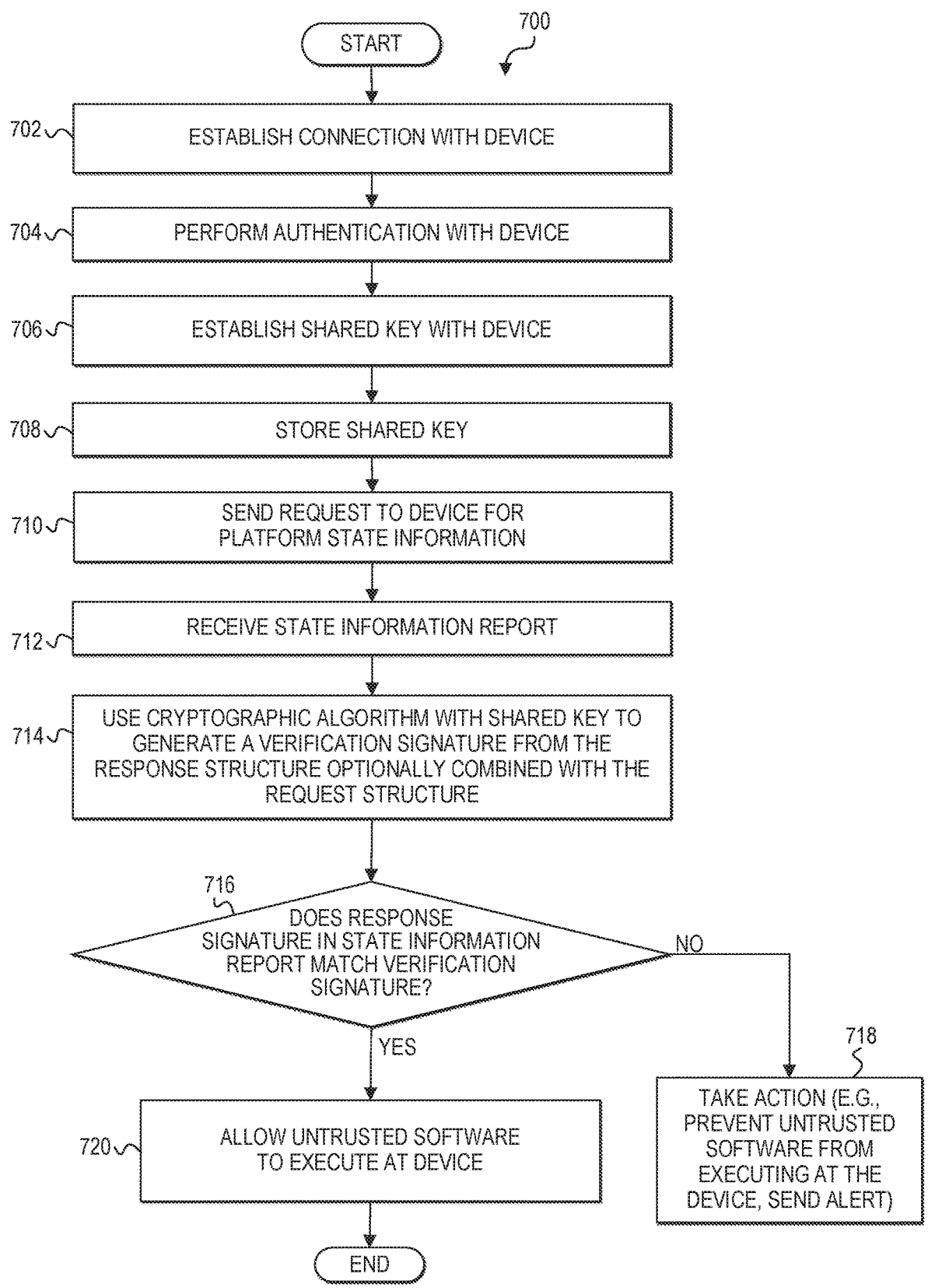
FIG. 7 is a simplified flow chart illustrating further example operations associated with a communication system for securely reporting platform state information according to at least one embodiment.

FIG. 7 is a simplified flowchart that illustrates a possible flow 700 of operations associated with secure reporting of platform state information to a remote server in accordance with embodiments herein. In at least one embodiment, a set of operations corresponds to activities of FIG. 7. Remote server 150, or a portion thereof, may utilize at least a portion of the set of operations. Remote server 150 may comprise means such as processor 159, for performing the operations. In an embodiment, one or more operations of flow 700 may be performed by authentication engine 154, state detection engine 156, and cryptographic algorithm 152.

At 702, a connection is established between a remote server (e.g., 150) and a device (e.g., 120). At 704, authentication is performed with the device. Any suitable authentication technique may be used based on particular implementations and needs as previously described herein. If authentication fails, then the remote server may take one or more appropriate actions such as, for example, blocking its IT services from being provided to the computing device, sending an appropriate error message to the device or other message channel, etc.

If authentication succeeds, then at 706, a shared key is established between the remote server and the device using any suitable key generation technique, which may be based on particular implementations and needs as previously described herein, for example, with reference to operation 606 of FIG. 6. At 708, the shared key may be stored in any suitable memory element or other local or remote storage accessible to the remote server.

At 710, the remote server sends a request to the device for state information of its computing platform. In at least one embodiment, the remote server generates a request structure that identifies particular items of state information. In at least one implementation, a bitmask may be used in the request structure with items of state information corresponding to individual bits. The bits corresponding to the selected items of state information that are being requested may be set to one and the bits corresponding to the unselected items of state information that are not being selected may be set to zero. It should be apparent, however, that embodiments herein could be configured in an alternative manner such as, for example, the selected items of state information being set to zero and the unselected items of state information being set to one. The selected bits may depend on the particular remote server, the particular IT services being provided to the device, and/or the particular preferences of the IT service provider. The remote server may also generate a nonce value (e.g., a one-time arbitrary value) and save the nonce value in a nonce field of the request structure. In at least some embodiments, a request signature may be generated from the request structure by applying a cryptographic algorithm (e.g., hash algorithm, encryption algorithm) with the shared key to the request structure to transform the request structure into a cryptographic value. The request signature may be included in the request to provide a signed request structure to the device receiving the request.

In other implementations, the remote server may not generate a request structure, but rather, the remote server may send a request for state information to the device without specifying particular state information being requested, without including a request structure, or by otherwise indicating a request for predetermined or default state information. In this scenario, a nonce may still be generated by the remote server and included in the request. Untrusted software (e.g., 122) in the device may generate the request structure based on predefined or default state information to be requested. The request structure may be generated with one or more bits in the bitmask being set to one, where the one or more bits correspond to one or more fields in registers containing the predetermined or default state information to be requested. In another scenario, the items of state information to be requested may be obtained by untrusted software from another local or remote source. The untrusted software may store the nonce value received in the request in the request structure that it generates.

At 712, the remote server receives a state information report from the device. At 714, a cryptographic algorithm with the shared key is used to generate a verification signature from the response structure in the state information report. The verification signature may be generated by applying the cryptographic algorithm with the shared key to the response structure extracted from the state information report to transform the response structure into a cryptographic value. In another embodiment, the cryptographic algorithm with the shared key is used to generate a verification signature from the response structure combined with the request structure in the state information report. For example, the response structure and the request structure may be concatenated, and the cryptographic algorithm with the shared key is then used to transform the concatenated response structure and request structure into a cryptographic value (i.e., verification signature).

At 716, a determination is made as to whether the response signature in the state information report matches (or otherwise corresponds to) the verification signature generated from the response structure (or from the response structure combined with the request structure). If the response signature in the state information report does not match (or otherwise correspond to) the verification signature, then at 718, any appropriate action may be taken based on particular implementations and needs. For example, the remote server may block the untrusted software (e.g., 122) on the computing device from running. In other examples, the remote server may instead, or in addition, send an appropriate alert to the computing device or other messaging channel.

If the response signature in the state information report does match (or otherwise corresponds to) the verification signature, as determined at 716, then at 720, the IT services offered by the remote server may be provided to the device. In one example, untrusted software (e.g., 122) may be allowed to continue executing in the device. In another example, other software may be downloaded to the device for execution and/or information, media content, etc. may be provided to the device. In yet another example, communications may be allowed to continue between the device and the remote server.

FIGS. 8-12 detail exemplary computer architectures and systems to implement embodiments of the above (such as device 120, computing platform 125, processor 130, memory element 140, remote server 150, processor 159, memory element 158, etc.). In some embodiments, one or more hardware components and/or instructions described above are emulated as detailed below or implemented as software modules. Other computer architecture designs known in the art for processors, mobile devices, computing systems (e.g., computing devices, servers, etc.), laptops, desktops, handheld PCs, personal digital assistants, engineering workstations, network devices, embedded processors, digital signal processors (DSPs), graphics devices, video game devices, set-top boxes, micro controllers, smart phones, wearable electronic devices, portable media players, hand held devices, various other electronic devices, and components thereof may also (or alternatively) be used. Generally, suitable computer architectures for embodiments disclosed herein can include, but are not limited to, configurations illustrated in FIGS. 8-12.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary processor cores are described in FIGS. 8A-10 followed by computer architectures described in FIGS. 11-12.

FIG. 8A is a block diagram illustrating both an exemplary in-order pipeline and an exemplary register renaming, out-of-order issue/execution pipeline according to one or more embodiments of this disclosure. FIG. 8B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like. In addition, processor core 890 and its components represent example architecture that could be used to implement processors 130, 159 and at least some of their respective components.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. Register units may also include model specific registers, debug registers, and control registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 854 and the physical register file(s) unit(s)

858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions.

The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch unit 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the scheduling stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein such as the read-only GET_STATE instruction for obtaining selected state information of a computing platform, where the state information is obtained from registers of a processor. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9B:
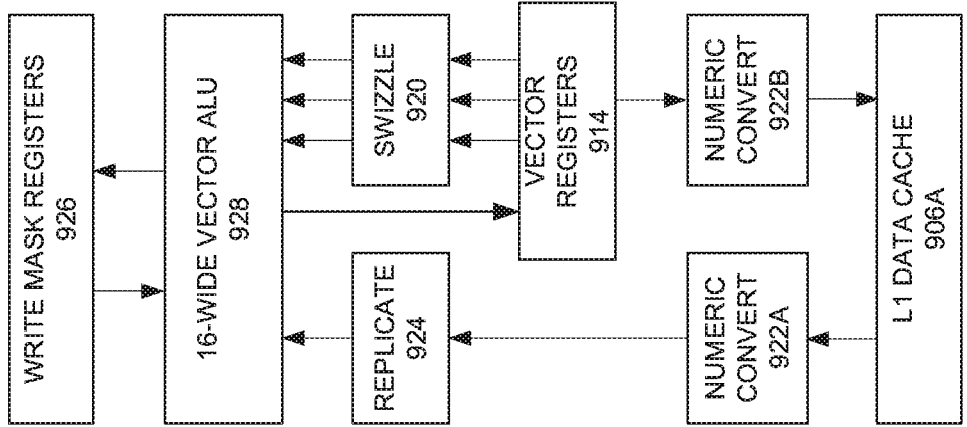
FIGS. 9A-9B illustrate a block diagram of a more specific exemplary in-order core architecture, which core could be one of several logic blocks (including other cores of the same type and/or different types) in a chip.
Figure 9A:
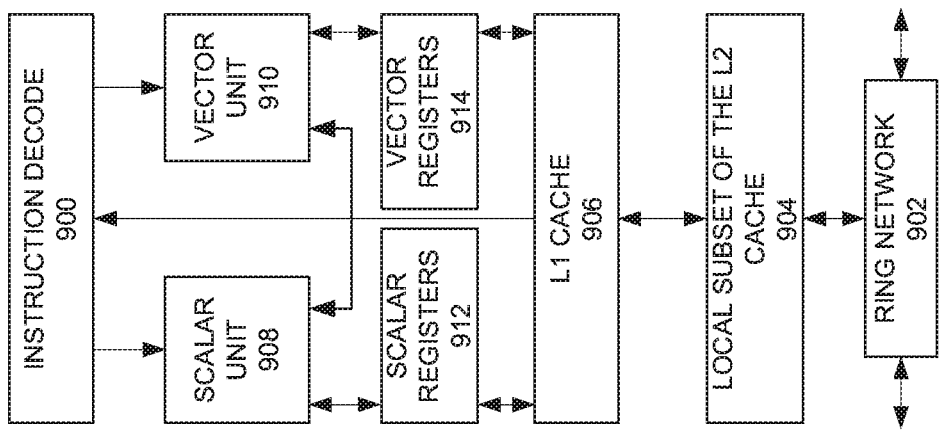

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect ring network 902 and with its local subset of the Level 2 (L2) cache 904, according to one or more embodiments of this disclosure. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the present disclosure may use a different approach (e.g., use a single register set or include a communication path that allows data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network 902 is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to one or more embodiments of this disclosure. FIG. 9B includes an L1 data cache 906A, part of the L2 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Figure 10:
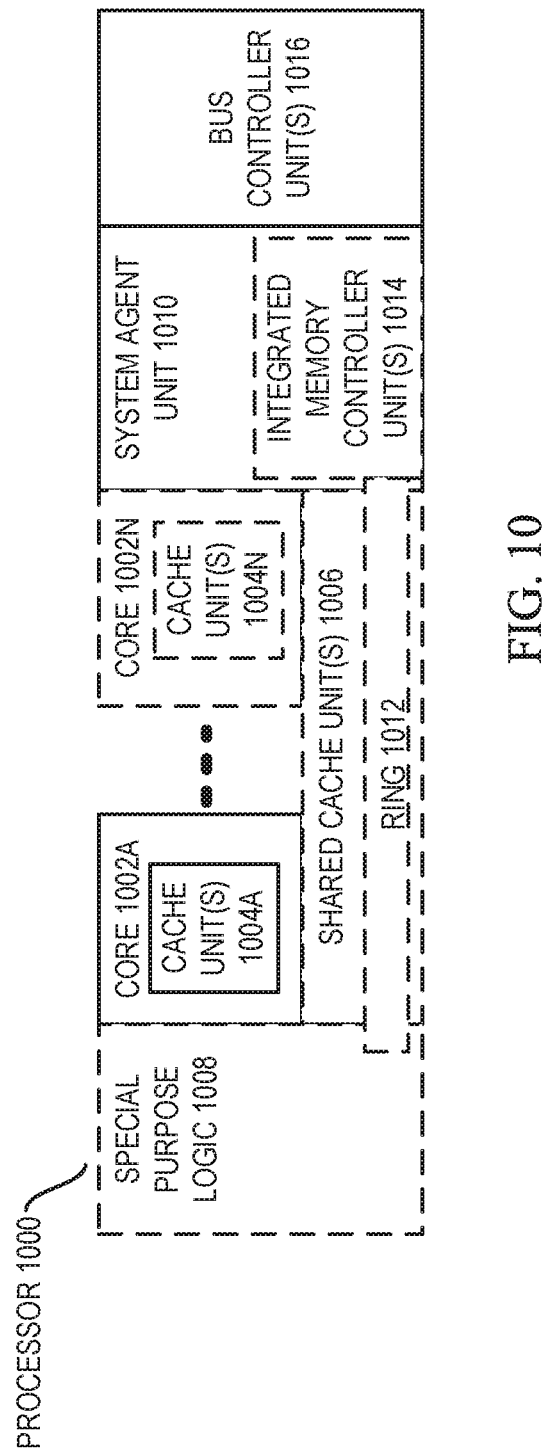
FIG. 10 is a block diagram of a processor that may have more than one core, may have an integrated memory controller, and may have integrated graphics according to at least one embodiment of the present disclosure.

FIG. 10 is a block diagram of a processor 1000 that may have more than one core, may have an integrated memory controller, and may have integrated graphics according to one or more embodiments of this disclosure. The solid lined boxes in FIG. 10 illustrate a processor 1000 with a single core 1002A, a system agent unit 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008. Processor 1000 and its components (e.g., cores 1002A-N, cache unit(s) 1004A-N, shared cache unit(s) 1006, etc.) represent example architecture that could be used to implement processors 130 and 159 and at least some of their respective components.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring-based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of executing the same instruction set, while others may be capable of executing only a subset of that instruction set or a different instruction set.

Figure 11:
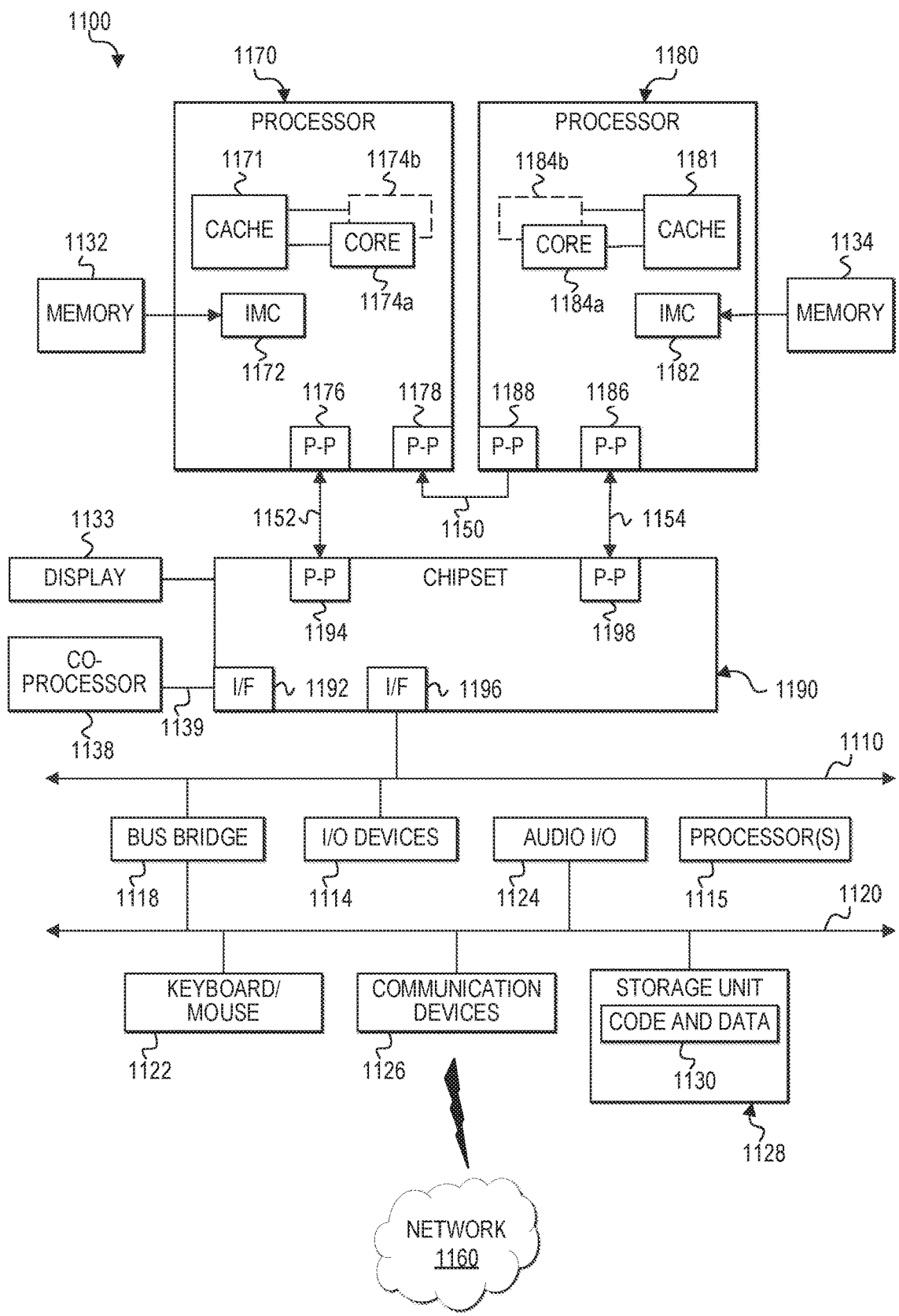
FIG. 11 is a block diagram of an example computer architecture according to at least one embodiment of the present disclosure.
Figure 12:
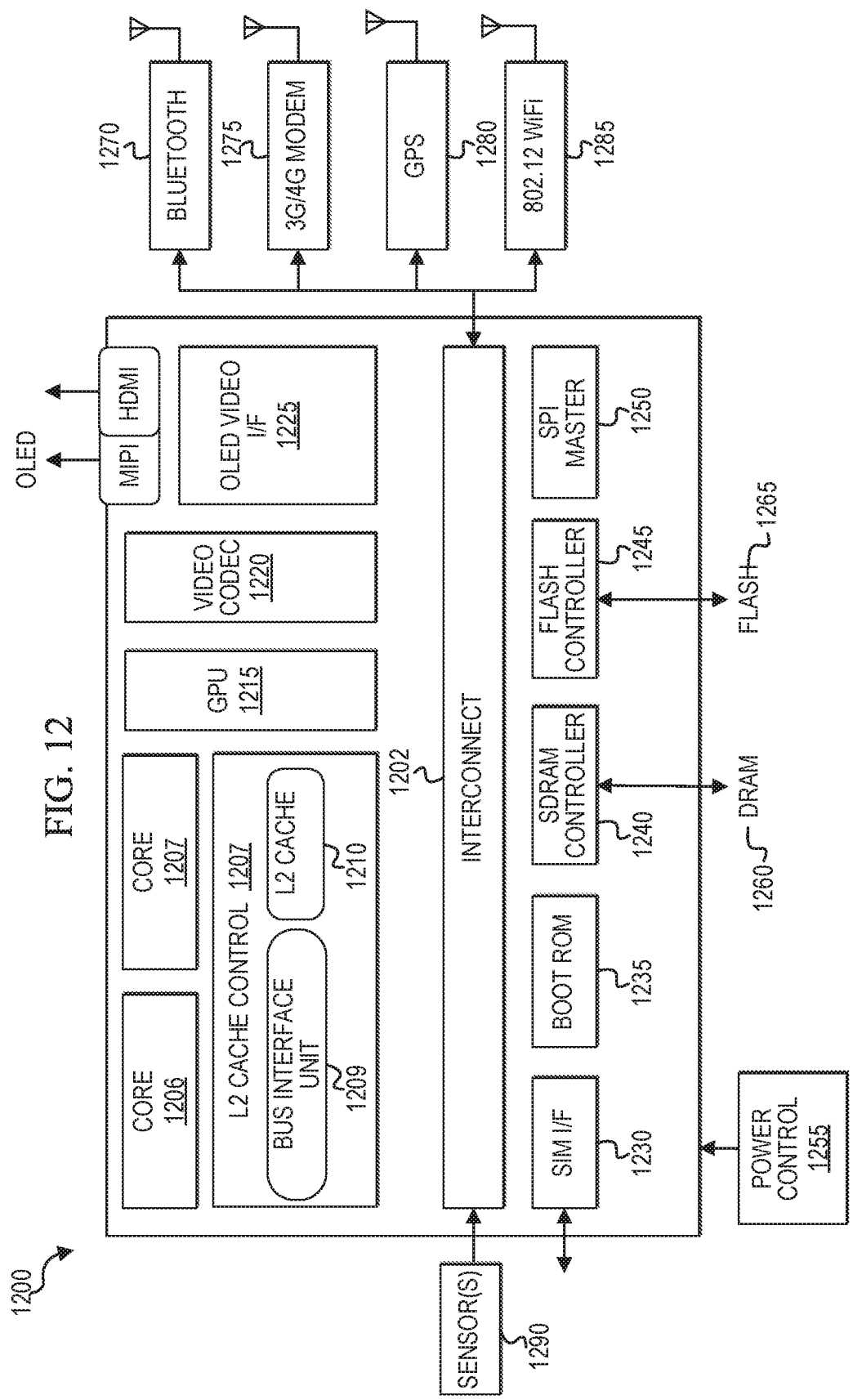
FIG. 12 is a block diagram of an example system-on-a-chip (SoC) computer architecture according to at least one embodiment according to at least one embodiment.

FIGS. 11-12 are block diagrams of exemplary computer architectures. Referring to FIG. 11, shown is a block diagram of an example computing system 1100 in accordance with one or more embodiments of the present disclosure. As shown in FIG. 11, computing system 1100 is a multiprocessor point-to-point interconnect system, and includes a first processor 1170 and a second processor 1180 coupled via a point-to-point interconnect 1150. In at least one embodiment, device 120 and/or remote server 150, shown and described herein, may be configured in the same or similar manner as computing system 1100. Processors 1170 and 1180 may be any type of processor including, but not limited to those previously discussed herein. In at least one embodiment, processors 130 and 159 may be configured in the same or similar manner as processors 1170 and 1180

Processors 1170 and 1180 may be implemented as single core processors 1174a and 1184a or multi-core processors 1174a-1174b and 1184a-1184b. Processors 1170 and 1180 may each include a cache 1171 and 1181 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 1170 and 1180 are shown including integrated memory controller (IMC) units 1172 and 1182, respectively. IMCs 1172 and 1182 couple the processors to respective memories, namely a memory element 1132 and a memory element 1134, which may be portions of main memory locally attached to the respective processors. In alternative embodiments, memory controller units 1172 and 1182 may be discrete logic separate from processors 1170 and 1180. Memory elements 1132 and/or 1134 may store various data to be used by processors 1170 and 1180 in achieving operations associated with secure reporting of platform state information, as outlined herein.

Processor 1170 also includes as part of its bus controller units, point-to-point (P-P) interface circuits 1176 and 1178; similarly, second processor 1180 includes P-P interfaces 1186 and 1188. Processors 1170, 1180 may exchange information via a point-to-point (P-P) interface 1150 using P-P interface circuits 1178, 1188. Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like. Chipset 1190 may also communicate with a display 1133 for displaying data that is viewable by a human user.

As shown herein, chipset 1190 is separated from processors 1170 and 1180. However, in an embodiment, chipset 1190 is integrated on the same chip as processors 1170 and

1180. Also, chipset 1190 may be partitioned differently with fewer or more integrated circuits.

Chipset 1190 may be coupled to a first bus 1110 via an interface 1196. In one embodiment, first bus 1110 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1110, along with a bus bridge 1118 which couples first bus 1110 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1110. I/O devices 1114 may include peripheral devices (including sensors) that provide information and/or instructions to processors 1170 and 1180 for processing or storage. Some peripheral devices also (or alternatively) provide a way for processors 1170 and 1180 to output information to users or other computing systems. Sensors may include, for example, video and/or still image sensors, audio sensors, touch sensors, fingerprint sensors, eye sensors, facial features sensors, other biometric sensors, etc.

In one embodiment, second bus 1120 may be a low pin count (LPC) bus. Various devices may be coupled to a second bus 1120 including, for example, a keyboard and/or mouse 1122 (or other input devices such as a touch screen, trackball, joystick, etc.), communication devices 1126 (such as modems, network interface devices, or other types of communication devices that may communicate through a network 1160), and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

The computing system depicted in FIG. 11 is a schematic illustration of an embodiment that may be utilized to implement various embodiments discussed herein. It will be appreciated that various components of the system depicted in FIG. 11 may be combined in a system-on-a-chip (SoC) architecture or in any other suitable configuration capable of achieving the secure reporting of platform state information, according to the various embodiments provided herein.

Turning to FIG. 12, FIG. 12 is a simplified block diagram associated with an example Advanced RISC Machines (ARM) ecosystem system-on-chip (SOC) 1200 of the present disclosure. At least one example implementation of the present disclosure can include the communication protection using secure reporting of platform state information features discussed herein and an ARM component. For example, in at least some embodiments, device 120, shown and described herein, could be configured in the same or similar manner as ARM ecosystem SOC 1200. Further, the architecture can be part of any type of tablet, smartphone (inclusive of Android™ phones, iPhones™), iPad™, Google Nexus™ Microsoft Surface™, personal computer, server, video processing components, laptop computer (inclusive of any type of notebook), Ultrabook™ system, wearable electronic device, any type of touch-enabled input device, etc.

In this example of FIG. 12, ARM ecosystem SOC 1200 may include multiple cores 1206-1207, an L2 cache control 1207, a bus interface unit 1209, an L2 cache 1210, a graphics processing unit (GPU) 1215, an interconnect 1202, a video codec 1220, and an organic light emitting diode (OLED) I/F 1225, which may be associated with mobile industry processor interface (MIPI)/high-definition multimedia interface (HDMI) links that couple to an OLED display.

ARM ecosystem SOC 1200 may also include a subscriber identity module (SIM) I/F 1230, a boot read-only memory (ROM) 1235, a synchronous dynamic random access memory (SDRAM) controller 1240, a flash controller 1245, a serial peripheral interface (SPI) master 1250, a suitable power control 1255, a dynamic RAM (DRAM) 1260, flash 1265, and one or more sensors 1290. In addition, one or more example embodiments include one or more communication capabilities, interfaces, and features such as instances of Bluetooth™ 1270, a 3G modem 1275, a global positioning system (GPS) 1280, and an 802.11 Wi-Fi 1285.

In operation, the example of FIG. 12 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Embodiments of the mechanisms disclosed herein may be implemented in hardware, software, firmware, or a combination of such implementation approaches. Embodiments of this disclosure may be implemented, at least in part, as computer programs or program code executing on programmable systems comprising at least one processor, a storage system (including volatile and non-volatile memory and/or storage elements), at least one input device, and at least one output device.

Program code (e.g., 1130, untrusted software, 121, cryptographic algorithms 122 and 152, authentication engine 154, state detection engine 156, etc.), may be applied to input instructions to perform at least some of the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor, among other examples.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Note that with the numerous examples provided herein, interaction may be described in terms of two, three, four, or more network elements, hosts, devices, computing systems, modules, engines, and/or other components. However, this has been done for purposes of clarity and example only. It should be appreciated that the system can be divided (e.g., segmented, partitioned, separated, etc.) in any suitable manner. For example, components of device 120 and/or remote server 150 may be provided in alternative configurations such that multiple hosts, nodes, network elements, devices, etc., coordinate to perform the activities of device 120 and/or remote server 150. Along similar design alternatives, any of the illustrated devices, servers, engines, services, algorithms, instructions, software, and other components of FIG. 1 may be consolidated or combined in various possible configurations, all of which are clearly within the broad scope of this specification. It should be appreciated that the embodiments illustrated in FIG. 1 (and its teachings) are readily scalable and can accommodate a large number of components (e.g., multiple devices such as device 120) communicating with remote server 150, multiple servers associated with remote server 150, etc.), as well as more complicated/sophisticated arrangements and configurations. Accordingly, the examples provided should not limit the scope or inhibit the broad teachings of the systems as potentially applied to a myriad of other architectures.

It is also important to note that the operations described with reference to the preceding FIGURES illustrate only some of the possible scenarios that may be executed by, or within, the systems (e.g., 100) and devices (e.g., 120, 150). Some of these operations may be deleted or removed where appropriate, or these operations may be modified or changed considerably without departing from the scope of the discussed concepts. In addition, the timing of these operations may be altered considerably and still achieve the results taught in this disclosure. As one example, the processes depicted in the accompanying figures do not necessarily require the particular order shown, or sequential order, to achieve the desired results. In certain implementations, multitasking and parallel processing may be advantageous. The preceding operational flows have been offered for purposes of example and discussion. Substantial flexibility is provided by the system in that any suitable arrangements, chronologies, configurations, and timing mechanisms may be provided without departing from the teachings of the discussed concepts.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Unless expressly stated to the contrary, the numbering adjectives 'first', 'second', 'third', etc., are intended to distinguish the particular terms (e.g., element, condition, module, activity, operation, claim element, etc.) they precede, but are not intended to indicate any type of order, rank, importance, temporal sequence, or hierarchy of the modified term unless clearly indicated otherwise. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments of the subject matter disclosed herein. Certain features that are described in this specification in the context of separate embodiments can also be implemented in combination in a single embodiment. Conversely, various features that are described in the context of a single embodiment may also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

OTHER NOTES AND EXAMPLES

The following examples pertain to embodiments in accordance with this specification. Example A1 provides an apparatus, a system, one or more machine readable storage mediums, a method, and/or hardware-, firmware-, and/or software-based logic, where the Example of A1 includes one or more instructions that when executed by one or more processors cause the one or more processors to: receive, from a remote server, a request for state information from a first processor; obtain the state information from one or more registers in the first processor based on a request structure indicated by a first instruction of the one or more instructions; generate a response structure based, at least in part, on the obtained state information; generate a signature based, at least in part, on the response structure, a cryptographic algorithm, and a shared key established between the one or more processors and the remote server; and communicate the response structure and the signature to the remote server. A system may also include a computing platform that includes one or more memory elements storing a software program including the one or more instructions for execution.

In Example A2, the subject matter of Example A1 can optionally include where the response structure and the request structure each include a same nonce value.

In Example A3, the subject matter of any one of Examples A1-A2 can optionally include where the first instruction, when executed by the one or more processors, cause the one or more processors to: identify a first memory address included in the first instruction; and locate the request structure at the first memory address in a memory element.

In Example A4, the subject matter of any one of Examples A1-A3 can optionally include where the one or more instructions, when executed by the one or more processors, cause the one or more processors to communicate, to the remote server, the request structure with the response structure and the signature.

In Example A5, the subject matter of Example A4 can optionally include where the first instruction, when executed by the one or more processors, cause the one or more processors to: identify a second memory address included in the first instruction; and store a state information report at the second memory address in a memory element, the state information report including the response structure, the signature, and the request structure.

In Example A6, the subject matter of any one of Examples A1-A5 can optionally include where the first instruction, when executed by the one or more processors, cause the one or more processors to: identify a field in a first register of the one or more registers, the field indicated in the request structure; and obtain a value from the identified field in the first register, wherein the response structure is generated based, at least in part, on the value from the identified field in the first register.

In Example A7, the subject matter of any one of Examples A1-A6 can optionally include where the one or more instructions are to be executed by the one or more processors based on a ring 3 privilege level.

In Example A8, the subject matter of any one of Examples A1-A6 can optionally include where the one or more instructions are to be executed by the one or more processors based on a ring 0 privilege level.

In Example A9, the subject matter of any one of Examples A1-A8 can optionally include where the request structure includes a bitmask corresponding to a plurality of fields in the one or more registers.

In Example A10, the subject matter of any one of Examples A1-A9 can optionally include where the first instruction is a read-only instruction.

In Example A11, the subject matter of any one of Examples A1-A10 can optionally include where the one or more instructions, when executed by the one or more processors, cause the one or more processors to: subsequent to communicating the response structure and the signature to the remote server, receive a command to block a software program associated with the instructions from executing; and block the software program in response to receiving the command to block the software program.

In Example A12, the subject matter of any one of Examples A1-A11 can optionally include where the state information includes one or more of configuration information of the processor (or computing platform) and current operational information of the processor (or computing platform).

The following examples pertain to embodiments in accordance with this specification. Example M1 provides a method comprising: receiving at a device from a remote server, a request for state information from a first processor of the device; obtaining the state information from one or more registers of the first processor based on a request structure indicated by a first instruction of a software program executing on the device; generating a response structure based, at least in part, on the obtained state information; using a cryptographic algorithm and a shared key established between the device and the remote server to generate a signature based, at least in part, on the response structure; and communicating the response structure and the signature to the remote server.

In Example M2, the subject matter of Example M1 can optionally include where the response structure and the request structure each include a same nonce value.

In Example M3, the subject matter of any one of Examples M1-M2 can optionally include identifying a first memory address included in the first instruction; and locating the request structure at the first memory address in a memory element.

In Example M4, the subject matter of any one of Examples M1-M3 can optionally include communicating, to the remote server, the request structure with the response structure and the signature.

In Example M5, the subject matter Example M4 can optionally include identifying a second memory address included in the first instruction; and storing a state information report at the second memory address in a memory element, the state information report including the response structure, the signature, and the request structure.

In Example M6, the subject matter of any one of Examples M1-M5 can optionally include identifying a field in a first register of the one or more registers, the field indicated in the request structure; and obtaining a value from the identified field in the first register, wherein the response structure is generated based, at least in part, on the value from the identified field in the first register.

In Example M7, the subject matter of any one of Examples M1-M6 can optionally include where the software program is executing in a ring 3 privilege level.

In Example M8, the subject matter of any one of Examples M1-M6 can optionally include where the instructions are to be executed by the one or more processors based on a ring 0 privilege level.

In Example M9, the subject matter of any one of Examples M1-M8 can optionally include where the request structure includes a bitmask corresponding to a plurality of fields in the one or more registers.

In Example M10, the subject matter of any one of Examples M1-M9 can optionally include where the first instruction is a read-only instruction.

In Example M11, the subject matter of any one of Examples M1-M10 can optionally include subsequent to communicating the response structure and the signature to the remote server, receiving a command to block a software program associated with the instructions from executing; and blocking the software program in response to receiving the command to block the software program.

In Example M12, the subject matter of any one of Examples M1-M11 can optionally include where the state information includes one or more of configuration information of the first processor (or computing platform) and current operational information of the first processor (or computing platform).

Example X1 provides an apparatus for secure reporting of platform state information, the apparatus comprising means for performing the method of any one of Examples A1-A11.

In Example X2, the subject matter of Example X1 can optionally include that the means for performing the method comprises at least one processor and at least one memory element.

In Example X3, the subject matter of Example X2 can optionally include that the at least one memory element comprises machine readable instructions that when executed, cause the apparatus to perform the method of any one of the preceding Examples.

In Example X4, the subject matter of any one of Examples X1-X3 can optionally include that the apparatus is one of a computing system, a processing element, or a system-on-a-chip.

Example X5 provides at least one machine readable storage medium comprising instructions for secure reporting of platform state information, where the instructions when executed realize an apparatus, realize a system, or implement a method as in any one of the preceding Examples.

What is claimed is:

1. At least one non-transitory machine readable medium comprising one or more instructions of a software program stored thereon, the one or more instructions when executed by one or more processors cause the one or more processors to:
   receive, from a remote server, a request for state information from a first processor;
   obtain the state information from one or more registers in the first processor based on a request structure indicated by a first instruction of the one or more instructions and on a first privilege level associated with the first instruction that is higher than a second privilege level of the software program, wherein the first privilege level is to permit the first instruction of the one or more instructions to access the state information in the one or more registers, and wherein the second privilege level of the software program is to prevent other instructions of the one or more instructions in the software program from accessing the state information in the one or more registers;
   generate a response structure based, at least in part, on the obtained state information;
   generate a signature based, at least in part, on the response structure, a cryptographic algorithm, and a shared key established between the one or more processors and the remote server; and
   communicate the response structure and the signature to the remote server.

2. The at least one non-transitory machine readable medium of claim 1, wherein the response structure and the request structure each include a same nonce value.

3. The at least one non-transitory machine readable medium of claim 1, wherein the first instruction, when executed by the one or more processors, causes the one or more processors to:
   identify a first memory address included in the first instruction; and
   locate the request structure at the first memory address in a memory element.

4. The at least one non-transitory machine readable medium of claim 1, wherein the one or more instructions, when executed by the one or more processors, cause the one or more processors to:
   communicate, to the remote server, the request structure with the response structure and the signature.

5. The at least one non-transitory machine readable medium of claim 4, wherein the first instruction, when executed by the one or more processors, causes the one or more processors to
   identify a second memory address included in the first instruction; and
   store a state information report at the second memory address in a memory element, the state information report including the response structure, the signature, and the request structure.

6. The at least one non-transitory machine readable medium of claim 1, wherein the first instruction, when executed by the one or more processors, causes the one or more processors to:
   identify a field in a first register of the one or more registers, the field indicated in the request structure; and
   obtain a value from the identified field in the first register, wherein the response structure is generated based, at least in part, on the value from the identified field in the first register.

7. The at least one non-transitory machine readable medium of claim 1, wherein the second privilege level of the software program is a ring 3 privilege level.

8. The at least one non-transitory machine readable medium of claim 1, wherein the first privilege level associated with the first instruction is a ring 0 privilege level.

9. The at least one non-transitory machine readable medium of claim 1, wherein the request structure includes a bitmask corresponding to a plurality of fields in the one or more registers.

10. The at least one non-transitory machine readable medium of claim 1, wherein the first instruction is a read-only instruction.

11. The at least one non-transitory machine readable medium of claim 1, wherein:
    subsequent to communicating the response structure and the signature to the remote server, the software program is to be blocked from execution by the one or more processors in response to the remote server failing to verify the signature.

12. A system, comprising:
    a computing platform including:
    one or more memory elements storing a software program including one or more instructions for execution; and
    one or more processors to execute the one or more instructions to:
      receive, from a remote server, a request for state information;
      obtain the state information from at least one register in the computing platform based on a request structure indicated by a first instruction of the one or more instructions and on a first privilege level associated with the first instruction that is higher than a second privilege level of the software program, wherein the first privilege level is to permit the first instruction of the one or more instructions to access the state information in the at least one register, and wherein the second privilege level of the software program is to prevent other instructions of the one or more instructions in the software program from accessing the state information in the at least one register;
      generate a response structure based, at least in part, on the obtained state information;

generate a signature based, at least in part, on the response structure, a cryptographic algorithm, and a shared key established between the computing platform and the remote server; and send the response structure and the signature to the remote server.

13. The system of claim 12, wherein the response structure and the request structure each include a same nonce value.

14. The system of claim 12, wherein the one or more processors are to execute the one or more instructions to further:

communicate the request structure to the remote server with the response structure and the signature.

15. The system of claim 12, wherein the one or more processors are to execute the one or more instructions to further:

identify a field in a first register of the computing platform, the field indicated in the request structure; and obtain a value from the identified field in the first register, wherein the response structure is generated based, at least in part, on the value from the identified field in the first register.

16. The system of claim 12, wherein the second privilege level of the software program is a ring 3 privilege level and the first privilege level associated with the first instruction is a ring 0 privilege level.

17. The system of claim 12, wherein the state information includes one or more of configuration information of the computing platform and current operational information of the computing platform.

18. A method, comprising:

receiving by a software program executing in an untrusted privilege level on a computing platform of a device, from a remote server, a request for state information from a first processor of the device;

obtaining the state information from one or more registers of the first processor based on a request structure indicated by a first instruction of the software program, wherein the untrusted privilege level in which the software program executes is lower than a trusted privilege level associated with the first instruction, wherein the trusted privilege level permits the first instruction of the software program to access the state information in the one or more registers, and wherein the untrusted privilege level of the software program prevents other instructions in the software program from accessing the state information in the one or more registers;

generating a response structure based, at least in part, on the obtained state information;

using a cryptographic algorithm and a shared key established between the device and the remote server to generate a signature based, at least in part, on the response structure; and communicating the response structure and the signature to the remote server.

19. The method of claim 18, wherein the response structure and the request structure each include a same nonce value.

20. The method of claim 18, wherein the software program executes in a ring 3 privilege level and the first instruction is executable in a ring 0 privilege level.

* * * * *